(12) United States Patent
Armon-Kest et al.

(10) Patent No.: US 8,856,130 B2
(45) Date of Patent: Oct. 7, 2014

(54) SYSTEM, A METHOD AND A COMPUTER PROGRAM PRODUCT FOR PERFORMANCE ASSESSMENT

(75) Inventors: Gilad Armon-Kest, Amirim (IL); Adina Lederhendler, Tel Aviv (IL); Arriel Johan Benis, Gan Yavne (IL); Dorit Zilberbrand, Givat Shmuel (IL); Shahar Siegman, Tel Aviv (IL)

(73) Assignee: Kenshoo Ltd., Tel Aviv (IL)

( * ) Notice: Subject to any disclaimer, the term of this patent is extended or adjusted under 35 U.S.C. 154(b) by 96 days.

(21) Appl. No.: 13/369,621

(22) Filed: Feb. 9, 2012

(65) Prior Publication Data

US 2013/0212108 A1 Aug. 15, 2013

(51) Int. Cl.
*G06F 17/30* (2006.01)

(52) U.S. Cl.
CPC ............................... *G06F 17/30707* (2013.01)
USPC .......................................................... 707/738

(58) Field of Classification Search
CPC ............................................... G06F 17/30707
See application file for complete search history.

(56) References Cited

U.S. PATENT DOCUMENTS

| | | | | |
|---|---|---|---|---|
| 5,428,778 A * | 6/1995 | Brookes | | 707/661 |
| 5,970,485 A * | 10/1999 | Sugaya et al. | | 1/1 |
| 6,195,652 B1 * | 2/2001 | Fish | | 1/1 |
| 6,782,377 B2 * | 8/2004 | Agarwal et al. | | 706/47 |
| 6,823,323 B2 * | 11/2004 | Forman et al. | | 706/20 |
| 7,617,176 B2 * | 11/2009 | Zeng et al. | | 1/1 |
| 7,743,059 B2 * | 6/2010 | Chan et al. | | 707/737 |
| 7,849,030 B2 * | 12/2010 | Ellingsworth | | 706/20 |
| 7,885,859 B2 * | 2/2011 | Dom et al. | | 706/25 |
| 7,974,989 B2 * | 7/2011 | Aronowich et al. | | 707/791 |
| 8,082,279 B2 * | 12/2011 | Weare | | 707/804 |
| 8,117,066 B1 * | 2/2012 | Walcott et al. | | 705/14.41 |
| 8,150,839 B2 * | 4/2012 | Choi et al. | | 707/721 |
| 8,156,138 B2 * | 4/2012 | Kohn et al. | | 707/769 |
| 8,255,347 B2 * | 8/2012 | Ellingsworth | | 706/20 |
| 8,473,532 B1 * | 6/2013 | Ben | | 707/829 |
| 2002/0184181 A1 * | 12/2002 | Agarwal et al. | | 707/1 |
| 2003/0217052 A1 * | 11/2003 | Rubenczyk et al. | | 707/3 |
| 2004/0059697 A1 * | 3/2004 | Forman | | 706/46 |
| 2006/0026152 A1 * | 2/2006 | Zeng et al. | | 707/5 |
| 2006/0074824 A1 * | 4/2006 | Li | | 706/20 |
| 2007/0214140 A1 * | 9/2007 | Dom et al. | | 707/7 |
| 2007/0282824 A1 * | 12/2007 | Ellingsworth | | 707/5 |
| 2008/0195654 A1 * | 8/2008 | Weare | | 707/102 |

(Continued)

OTHER PUBLICATIONS

Caruana, et al., "An Empirical Comparison of Supervised Learning Algorithms", Proceedings of the 23rd International Conference on Machine Learning, Pittsburgh, PA, 8 pages, (2006).

(Continued)

*Primary Examiner* — Alexey Shmatov
*Assistant Examiner* — Hubert Cheung
(74) *Attorney, Agent, or Firm* — Wiggin and Dana LLP; Gregory S. Rosenblatt

(57) ABSTRACT

A system, a computerized method, and a computer program product for classification of items based on their attributes and on a classification scheme that is defined based on information pertaining to each item of a set of items, and which is indicative of: (a) a quantity of occurrences of the item in a sample; (b) a quantity of successful occurrences of the item in the sample; and (c) at least one attribute of the item with regard to at least one variable out of a set of variables.

28 Claims, 8 Drawing Sheets

(56) References Cited

U.S. PATENT DOCUMENTS

| | | | |
|---|---|---|---|
| 2008/0201324 A1* | 8/2008 | Aronowich et al. | 707/5 |
| 2008/0319932 A1* | 12/2008 | Yih et al. | 706/20 |
| 2009/0099988 A1* | 4/2009 | Stokes et al. | 706/20 |
| 2009/0132553 A1* | 5/2009 | Kohn et al. | 707/100 |
| 2009/0319508 A1 | 12/2009 | Yih et al. | |
| 2010/0106599 A1* | 4/2010 | Kohn et al. | 705/14.54 |
| 2011/0029375 A1* | 2/2011 | Mason | 705/14.42 |
| 2011/0047168 A1* | 2/2011 | Ellingsworth | 707/749 |
| 2011/0071900 A1* | 3/2011 | Kamath et al. | 705/14.46 |
| 2011/0087542 A1* | 4/2011 | Kamath | 705/14.43 |
| 2011/0087544 A1* | 4/2011 | Mason | 705/14.49 |
| 2011/0099133 A1* | 4/2011 | Chang et al. | 706/12 |
| 2011/0137908 A1* | 6/2011 | Dom et al. | 707/740 |
| 2011/0161331 A1* | 6/2011 | Chung et al. | 707/751 |
| 2012/0130771 A1* | 5/2012 | Kannan et al. | 705/7.32 |
| 2012/0215777 A1* | 8/2012 | Malik et al. | 707/737 |
| 2013/0110620 A1* | 5/2013 | Zhu et al. | 705/14.49 |
| 2013/0110843 A1* | 5/2013 | Ellingsworth | 707/741 |

OTHER PUBLICATIONS

Joshi, et al., "Keyword Generation for Search Engine Advertising", Sixth IEEE International Conference on Data Mining—Workshops (ICDMW'06), (2006).

Kalwani, "Maximum Likelihood Estimation of Zero-Order Models Given Variable Numbers of Purchases Per Household", Journal of Marketing Research, vol. 17, No. 4, pp. 547-551, (1980).

Kotsiantis, "Supervised Machine Learning: A Review of Classification Techniques", Informatica, vol. 31, pp. 249-268, (2007).

Non-final Official Action mailed Sep. 11, 2012, issued for U.S. Appl. No. 13/032,067, 11 pages.

U.S. Appl. No. 12/954,436, downloaded Mar. 11, 2013, 335 pages.

U.S. Appl. No. 13/032,067, downloaded Mar. 11, 2013, 107 pages.

* cited by examiner

SYSTEM, A METHOD AND A COMPUTER PROGRAM PRODUCT FOR PERFORMANCE ASSESSMENT

FIELD OF THE INVENTION

This invention relates to performance assessment, and more specifically to performance assessment which is based on classification.

BACKGROUND OF THE INVENTION

Machine learning may be used to automatically define rules (also referred to as "hypotheses") from a basic dataset (also referred to as "training data"). The rules which are defined based on the training data may later be used to make predictions about future raw dates. When used for classification, machine learning may be implemented for building, based on the training data, a model of classes distribution in terms of attributed predictor variables, and later using the resulting classifier to assign classes to testing items (also referred to as "instances"), where the attributes of the predictor variable of those instances are known, but the proper classification is unknown.

Every item in the dataset used by machine learning algorithms is represented using the same set of variables (even though, in practice, the information available for each given item may not include information pertaining to each and every one of those variables). The variables may be continuous, categorical or binary.

There are two main categories of machine learning—supervised and unsupervised. If, in the training data, the items are given with known classification (the corresponding correct outputs), then the learning is called supervised, in contrast to unsupervised learning, where classification of items is not provided as part of the training data. Applying of such unsupervised algorithms (also referred to as "clustering" algorithms) may be used to discover unknown, but useful, classes of items.

Classification of items based on a classification scheme generated by machine learning into productivity indicative classes may be implemented in various fields of technology. For example, the expected productivity of a machine, its likelihood of failure and so forth may be estimated based on various attributes of such a machine and on such a classification scheme.

In another example, in the electronic advertising field, effectiveness may be determined, among other criteria, by the ability of the marketer to target his advertisements in a focused and effective way to different audiences. Providing a marketer with reliable information pertaining to finely classified subgroups of such audiences (based on people, search keywords, social media data, etc.) may increase the effectiveness and productivity of marketing systems (and especially advertising systems) used by the marketer.

In many cases, however, information by which such a classification scheme may be generated by machine learning processes is limited. One attempting to generate a classification scheme for classification of search keywords into productivity indicative classes based on attributes of those keywords would, many a time, find out that any information regarding the effectiveness of a great deal of those search keywords is limited, if at all present.

A significant portion out of all the search keywords which are considered relevant by a given marketer may consist of keywords which have infrequently been entered by search engine users, even more infrequently led to advertisements targeting those users, hardly ever resulted in clicking of such an advertisement by a user, and scarcely resulted in a conversion (in which such a user purchased an item, or otherwise acted in a fashion desirable to the marketer).

There is therefore a need to provide effective techniques of performance assessment, and more specifically to performance assessment which is based on classification. There is yet a further need for providing effective techniques of classification based performance assessment of electronic advertising, and of classification based performance assessment in situations in which the training data for a significant part of the training set includes scarce information on which to base determination of productivity.

U.S. patent application Ser. No. 13/032,067, entitled "Method for Determining an Enhanced Value to Keywords Having Sparse Data", having common inventors with the present application, discloses a method for associating sparse keywords with non-sparse keywords. The method comprises determining from metrics of a plurality of keywords a list of sparse keywords and non-sparse keywords; generating a similarity score for each sparse keyword with respect of each non-sparse keyword; associating a sparse keyword with a non-sparse keyword; and storing the association between the non-sparse keyword and the sparse keyword in a database.

SUMMARY OF THE INVENTION

In accordance with an aspect of the presently disclosed subject matter, there is provided a system for classification, the system including: (a) a storage apparatus, configured to store information pertaining to each item of a set of items, the information being indicative of: (i) a quantity of occurrences of the item in a sample; (ii) a quantity of successful occurrences of the item in the sample; and (iii) at least one attribute of the item with regard to at least one variable out of a set of variables; wherein the quantity of occurrences of at least one of the items is larger than one; and (b) a processor, including: (i) a classification scheme determination module, configured to define a classification scheme for classification of items into classes based on at least one of the variables in a defining process which includes assigning a score to a variable out of the at least one variable, based on a plurality of quantities of successful occurrences of items, each of the quantities is a quantity of successful occurrences having a corresponding attribute out of a plurality of attributes of the variable; (ii) a class management module, configured to obtain a respective subset of the plurality of items for each out of a plurality of the classes, by applying the classification scheme to attributes of a plurality of items of the set; and to determine, with respect to each class of the plurality of classes, an outcome estimation based on quantities of successful occurrences of items of the respective subset of items of said class; and (iii) a performance analysis module, configured to compute for an analyzed item a performance assessment which is based on an outcome estimation of a class out of the classes that is a result of application of the classification scheme to attributes of the analyzed item, thereby enabling a selective application of an industrial process, wherein the selective application is responsive to the performance assessment.

In accordance with an embodiment of the presently disclosed subject matter, there is further provided a system, wherein the defining process includes assigning a score to each out of a plurality of attributes of a plurality of variables of the set, based on a quantity of occurrences of items having the attribute.

In accordance with an embodiment of the presently disclosed subject matter, there is yet further provided a system, wherein at least half of the items of the sample whose quantity of occurrences is larger than zero and whose information is used in the defining of the classification scheme appear in the sample less than ten times.

In accordance with an embodiment of the presently disclosed subject matter, there is further provided a system, wherein the items are keywords.

In accordance with an embodiment of the presently disclosed subject matter, there is yet further provided a system wherein the storage apparatus is configured to store for each keyword of the keywords of the set information in which: (a) the quantity of occurrences of the keyword in the sample is indicative of a number of redirections of users which resulted from queries that included the keyword within a sampled time frame; (b) the quantity of successful occurrences of the keyword in the sample is indicative of a number of conversions resulting from the redirections; wherein the class management module is configured to determining, with respect to each class of the plurality of classes, a conversion-rate estimation, based on quantities of redirections of keywords of a respective subset of keywords of the class; wherein the defining process includes assigning to an analyzed keyword a conversion-rate assessment which is based on a conversion-rate estimation of a class out of the classes that is a result of application of the classification scheme to attributes of the analyzed keywords, thereby enabling a selective application of an industrial process, wherein the selective application is responsive to the performance assessment.

In accordance with an embodiment of the presently disclosed subject matter, there is yet further provided a system, wherein the performance analysis module is configured to update an entry that is associated with the analyzed keyword in a bidding database based on the conversion-rate assessment, for facilitating cost reduction in a bidding process that depends on the analyzed keyword.

In accordance with an embodiment of the presently disclosed subject matter, there is yet further provided a system, wherein each of the items corresponds to a targeted group of people.

In accordance with an embodiment of the presently disclosed subject matter, there is yet further provided a system, wherein each occurrence is an impression, and each successful occurrence is a click.

In accordance with an embodiment of the presently disclosed subject matter, there is yet further provided a system, wherein the defining of the classification scheme is irrespective of a success rate of any item of the set of items.

In accordance with an embodiment of the presently disclosed subject matter, there is yet further provided a system, wherein the assigning includes assigning the score to each out of the plurality of attributes based on a quantity of successful occurrences of items having the attribute.

In accordance with an embodiment of the presently disclosed subject matter, there is yet further provided a system, wherein the assigning includes assigning the score to each out of the plurality of attributes based on a quantity of all of the successful occurrences of items having the attribute.

In accordance with an embodiment of the presently disclosed subject matter, there is yet further provided a system, wherein the assigning includes assigning the score to each out of the plurality of attributes based on a quantity of unsuccessful occurrences of items having the attribute.

In accordance with an embodiment of the presently disclosed subject matter, there is yet further provided a system, wherein the assigning of the score to each out of the plurality of attributes includes computing the score to the attribute based on: (a) a quantity of all of the successful occurrences which are associated with the attribute in a subset of the sample, (b) a quantity of all of the occurrences in the subset which are associated with the attribute and which are not successful occurrences; and (c) a quantity of all of the occurrences in the subset which are associated with the attribute.

In accordance with an embodiment of the presently disclosed subject matter, there is yet further provided a system, wherein the defining of the classification scheme further includes computing for each one of the plurality of the variables a variable-score based on the scores assigned to at least two of the attributes of the variable, wherein the defining of the classification scheme is based on the variable-scores of at least two of the plurality of variables.

In accordance with an aspect of the presently disclosed subject matter, there is yet further provided a computerized method for classification, the method including storing in a storage apparatus information pertaining to each item of a set of items, the information being indicative of: a quantity of occurrences of the item in a sample; a quantity of successful occurrences of the item in the sample; and at least one attribute of the item with regard to at least one variable out of a set of variables; wherein the quantity of occurrences of at least one of the items is larger than one; defining a classification scheme for classification of items into classes based on at least one of the variables; wherein the defining of the classification scheme includes assigning a score to a variable out of the at least one variable, based on a plurality of quantities of successful occurrences of items, each of the quantities is a quantity of successful occurrences having a corresponding attribute out of a plurality of attributes of the variable; applying the classification scheme to attributes of a plurality of items of the set, thereby obtaining for each out of a plurality of the classes a respective subset of the plurality of items; determining, with respect to each class of the plurality of classes, an outcome estimation based on quantities of successful occurrences of items of the respective subset of items of the class; and computing for an analyzed item a performance assessment which is based on an outcome estimation of a class out of the classes that is a result of application of the classification scheme to attributes of the analyzed item, thereby enabling a selective application of an industrial process, wherein the selective application is responsive to the performance assessment.

In accordance with an embodiment of the presently disclosed subject matter, there is yet further provided a method, wherein the defining of the classification scheme includes assigning a score to each out of a plurality of attributes of a plurality of variables of the set, based on a quantity of occurrences of items having the attribute.

In accordance with an embodiment of the presently disclosed subject matter, there is yet further provided a method, wherein at least half of the items of the sample whose quantity of occurrences is larger than zero and whose information is used in the defining of the classification scheme appear in the sample less than ten times.

In accordance with an embodiment of the presently disclosed subject matter, there is yet further provided a method, wherein the items are keywords.

In accordance with an embodiment of the presently disclosed subject matter, there is yet further provided a method wherein the storing includes storing in the storage apparatus for each keyword of the keywords of the set information in which: (a) the quantity of occurrences of the keyword in the sample is indicative of a number of redirections of users which resulted from queries that included the keyword within a sampled time frame; (b) the quantity of successful occurrences of the keyword in the sample is indicative of a number of conversions resulting from the redirections; wherein the determining includes determining, with respect to each class of the plurality of classes, a conversion-rate estimation, based on quantities of redirections of keywords of a respective subset of keywords of the class; wherein the assigning includes assigning to an analyzed keyword a conversion-rate assessment which is based on a conversion-rate estimation of a class out of the classes that is a result of application of the classification scheme to attributes of the analyzed keywords, thereby enabling a selective application of an industrial process, wherein the selective application is responsive to the performance assessment.

In accordance with an embodiment of the presently disclosed subject matter, there is yet further provided a method, further including updating an entry that is associated with the analyzed keyword in a bidding database based on the conversion-rate assessment, for facilitating cost reduction in a bidding process that depends on the analyzed keyword.

In accordance with an embodiment of the presently disclosed subject matter, there is yet further provided a method, wherein each of the items corresponds to a targeted group of people.

In accordance with an embodiment of the presently disclosed subject matter, there is yet further provided a method, wherein each occurrence is an impression, and each successful occurrence is a click.

In accordance with an embodiment of the presently disclosed subject matter, there is yet further provided a method, wherein each occurrence is a click, and each successful occurrence is a conversion.

In accordance with an embodiment of the presently disclosed subject matter, there is yet further provided a method, wherein the defining of the classification scheme is irrespective of a success rate of any item of the set of items.

In accordance with an embodiment of the presently disclosed subject matter, there is yet further provided a method, wherein the assigning includes assigning the score to each out of the plurality of attributes based on a quantity of successful occurrences of items having the attribute.

In accordance with an embodiment of the presently disclosed subject matter, there is yet further provided a method, wherein the assigning includes assigning the score to each out of the plurality of attributes based on a quantity of all of the successful occurrences of items having the attribute.

In accordance with an embodiment of the presently disclosed subject matter, there is yet further provided a method, wherein the assigning includes assigning the score to each out of the plurality of attributes based on a quantity of unsuccessful occurrences of items having the attribute.

In accordance with an embodiment of the presently disclosed subject matter, there is yet further provided a method, wherein the assigning of the score to each out of the plurality of attributes includes computing the score to the attribute based on: (a) a quantity of all of the successful occurrences which are associated with the attribute in a subset of the sample, (b) a quantity of all of the occurrences in the subset which are associated with the attribute and which are not successful occurrences; and (c) a quantity of all of the occurrences in the subset which are associated with the attribute.

In accordance with an embodiment of the presently disclosed subject matter, there is yet further provided a method, wherein the defining of the classification scheme further includes computing for each one of the plurality of the variables a variable-score based on the scores assigned to at least two of the attributes of the variable, wherein the defining of the classification scheme is based on the variable-scores of at least two of the plurality of variables.

In accordance with an aspect of the presently disclosed subject matter, there is yet further provided a program storage device readable by machine, tangibly embodying a program of instructions executable by the machine to perform method for classification including the steps of: storing in a storage apparatus information pertaining to each item of a set of items, the information being indicative of: (a) a quantity of occurrences of the item in a sample; (b) a quantity of successful occurrences of the item in the sample; and (c) at least one attribute of the item with regard to at least one variable out of a set of variables; wherein the quantity of occurrences of at least one of the items is larger than one; defining a classification scheme for classification of items into classes based on at least one of the variables; wherein the defining of the classification scheme includes assigning a score to a variable out of the at least one variable, based on a plurality of quantities of successful occurrences of items, each of the quantities is a quantity of successful occurrences having a corresponding attribute out of a plurality of attributes of the variable; applying the classification scheme to attributes of a plurality of items of the set, thereby obtaining for each out of a plurality of the classes a respective subset of the plurality of items; determining, with respect to each class of the plurality of classes, an outcome estimation based on quantities of successful occurrences of items of the respective subset of items of the class; and computing for an analyzed item a performance assessment which is based on an outcome estimation of a class out of the classes that is a result of application of the classification scheme to attributes of the analyzed item, thereby enabling a selective application of an industrial process, wherein the selective application is responsive to the performance assessment.

In accordance with an embodiment of the presently disclosed subject matter, there is yet further provided a program storage device, wherein the defining of the classification scheme includes assigning a score to each out of a plurality of attributes of a plurality of variables of the set, based on a quantity of occurrences of items having the attribute.

In accordance with an embodiment of the presently disclosed subject matter, there is yet further provided a program storage device, wherein at least half of the items of the sample whose quantity of occurrences is larger than zero and whose information is used in the defining of the classification scheme appear in the sample less than ten times.

In accordance with an embodiment of the presently disclosed subject matter, there is yet further provided a program storage device, wherein the items are keywords.

In accordance with an embodiment of the presently disclosed subject matter, there is yet further provided a program storage device wherein the storing includes storing in the storage apparatus for each keyword of the keywords of the set information in which: (a) the quantity of occurrences of the keyword in the sample is indicative of a number of redirections of users which resulted from queries that included the keyword within a sampled time frame; (b) the quantity of successful occurrences of the keyword in the sample is indicative of a number of conversions resulting from the redirections; wherein the determining includes determining, with respect to each class of the plurality of classes, a conversion-rate estimation, based on quantities of redirections of keywords of a respective subset of keywords of the class; wherein the assigning includes assigning to an analyzed keyword a conversion-rate assessment which is based on a conversion-rate estimation of a class out of the classes that is a result of application of the classification scheme to attributes of the analyzed keywords, thereby enabling a selective application of an industrial process, wherein the selective application is responsive to the performance assessment.

In accordance with an embodiment of the presently disclosed subject matter, there is yet further provided a program storage device wherein the program of instructions further includes instructions for updating an entry that is associated with the analyzed keyword in a bidding database based on the conversion-rate assessment, for facilitating cost reduction in a bidding process that depends on the analyzed keyword.

In accordance with an embodiment of the presently disclosed subject matter, there is yet further provided a program storage device, wherein each of the items corresponds to a targeted group of people.

In accordance with an embodiment of the presently disclosed subject matter, there is yet further provided a program storage device, wherein each occurrence is an impression and each successful occurrence is a click.

In accordance with an embodiment of the presently disclosed subject matter, there is yet further provided a program storage device, wherein each occurrence is a click and each successful occurrence is a conversion.

In accordance with an embodiment of the presently disclosed subject matter, there is yet further provided a program storage device, wherein the defining of the classification scheme is irrespective of a success rate of any item of the set of items.

In accordance with an embodiment of the presently disclosed subject matter, there is yet further provided a method, wherein the assigning includes assigning the score to each out of the plurality of attributes based on a quantity of successful occurrences of items having the attribute.

In accordance with an embodiment of the presently disclosed subject matter, there is yet further provided a program storage device, wherein the assigning includes assigning the score to each out of the plurality of attributes based on a quantity of all of the successful occurrences of items having the attribute.

In accordance with an embodiment of the presently disclosed subject matter, there is yet further provided a program storage device, wherein the assigning includes assigning the score to each out of the plurality of attributes based on a quantity of unsuccessful occurrences of items having the attribute.

In accordance with an embodiment of the presently disclosed subject matter, there is yet further provided a program storage device, wherein the assigning of the score to each out of the plurality of attributes includes computing the score to the attribute based on: (a) a quantity of all of the successful occurrences which are associated with the attribute in a subset of the sample, (b) a quantity of all of the occurrences in the subset which are associated with the attribute and which are not successful occurrences; and (c) a quantity of all of the occurrences in the subset which are associated with the attribute.

In accordance with an embodiment of the presently disclosed subject matter, there is yet further provided a method, wherein the defining of the classification scheme further includes computing for each one of the plurality of the variables a variable-score based on the scores assigned to at least two of the attributes of the variable, wherein the defining of the classification scheme is based on the variable-scores of at least two of the plurality of variables.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1A:
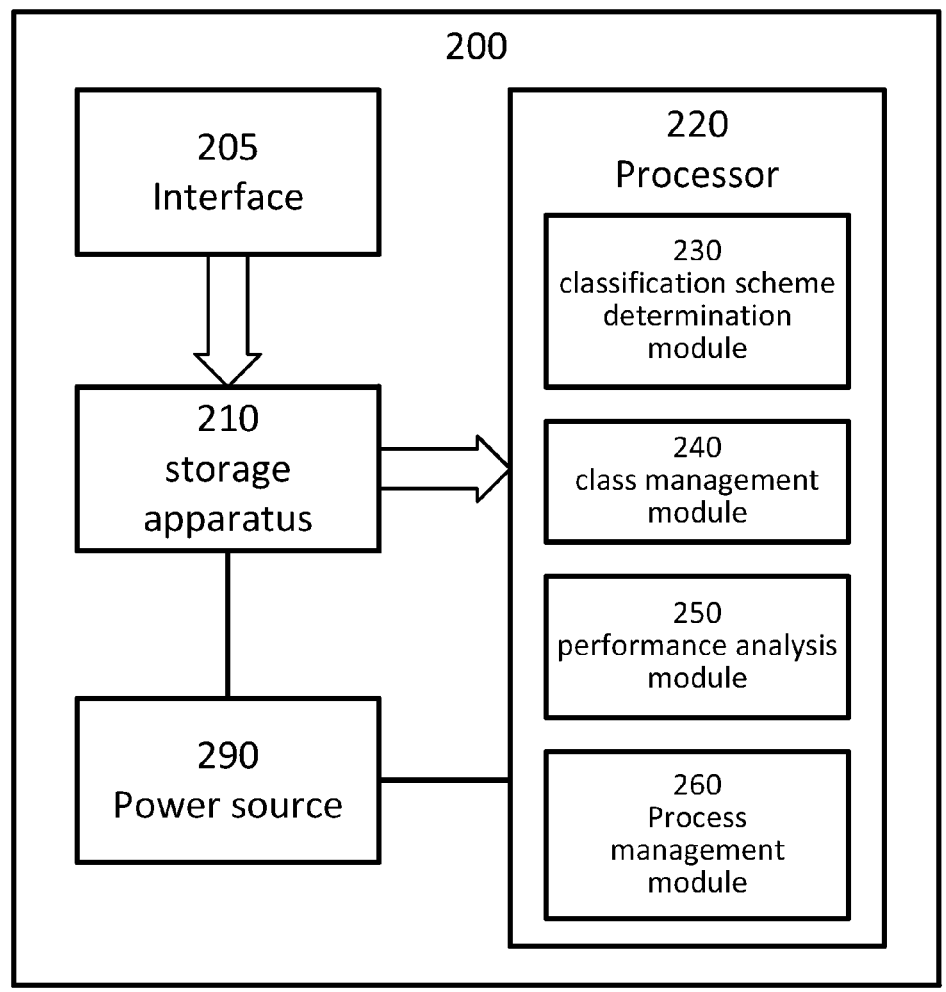
FIG. 1A illustrates a system for classification, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "determining", "generating", "setting", "configuring", "selecting", "computing", "assigning", or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 1A illustrates system 200 which is a system for classification, according to an embodiment of the invention. As will be discussed below in greater detail, system 200 may be used for classification of a wide range of entities. Furthermore, system 200 may be further configured to utilize the classification to further process the classified entities. Some of the ways in which system 200 may operate will become clearer when viewed in the light of methods 500, 600 and 800 discussed below.

System 200 includes storage apparatus 210, which is configured to store information pertaining to each item of a set of items, the information being indicative of: (a) a quantity of occurrences of the item in a sample; (b) a quantity of successful occurrences of the item in the sample; and (c) at least one attribute of the item with regard to at least one variable out of a set of variables. It is noted that the quantities of different occurrences may differ from each other. Also, the quantity of occurrences of at least one of the items may be larger than one. Examples of ways in which classification scheme determination module 230 may operate are discussed in further detail in relation to methods 500, 600, and 800, and especially to stages 515, 615, and 815 thereof (respectively). The information stored in storage apparatus 210 may be obtained from various sources. For example, it may be generated by processor 220, and/or received from an external source (e.g. by interface 205).

System 200 also includes processor 220. Processor 220 may be a general purpose processing module (incorporating hardware and possibly firmware and/or software as well). Optionally, processor 220 may include dedicated processing module (whether analog, digital, or any combination thereof), which includes hardware (and possibly firmware and/or software as well) designed dedicatedly for the functions described below. Examples of ways in which processor 220 may operate are discussed in further detail in relation to methods 500, 600, and 800, and especially to stages 520-550, 620-650, and 820-850 thereof (respectively). Those equivalents may be implemented by modules such as modules 230, 240, 250, and/or 260, but this is not necessarily so, and other modules may be implemented as well.

Processor 220 includes classification scheme determination module 230, which is configured to define a classification scheme for classification of items into classes based on at least one of the variables in a defining process which includes assigning a score to a variable out of the at least one variable, based on a plurality of quantities of successful occurrences of items, each of the quantities is a quantity of successful occurrences having a corresponding attribute out of a plurality of attributes of the variable. Examples of ways in which classification scheme determination module 230 may operate are discussed in further detail in relation to methods 500, 600, and 800, and especially to stages 520, 620, and 820 thereof (respectively).

Processor 220 further includes class management module 240, configured to obtain a respective subset of the plurality of items for each out of a plurality of the classes, by applying the classification scheme to attributes of a plurality of items of the set; and to determine, with respect to each class of the plurality of classes, an outcome estimation based on quantities of successful occurrences of items of the respective subset of items of said class. Examples of ways in which class management module 240 may operate are discussed in further detail in relation to methods 500, 600, and 800, and especially to stages 530, 630, and 830 thereof (respectively).

Processor 220 may also include a performance analysis module 250, which is configured to compute for an analyzed item a performance assessment which is based on an outcome estimation of a class out of the classes that is a result of application of the classification scheme to attributes of the analyzed item, thereby enabling a selective application of an industrial process, wherein the selective application is responsive to the performance assessment. Examples of ways in which performance analysis module 250 may operate are discussed in further detail in relation to methods 500, 600, and 800, and especially to stages 540, 640, and 840 thereof (respectively).

Processor 220 may also include a process management module 260, which is configured to instruct (and possibly also to monitor and/or otherwise manage) one or more industrial processes, in response to the performance assessment. Examples of ways in which process management module 260 may operate are discussed in further detail in relation to methods 500, 600, and 800, and especially to stages 550, 650 and 850 thereof (respectively).

As aforementioned, each of the modules or components of system 200 may be implemented in software, hardware, firmware, or any combination thereof. Additionally, system 200 may also include other components that are not illustrated, and whose inclusion will be apparent to a person who is of skill in the art—e.g. a power source 290, a display, etc.

Figure 1B:
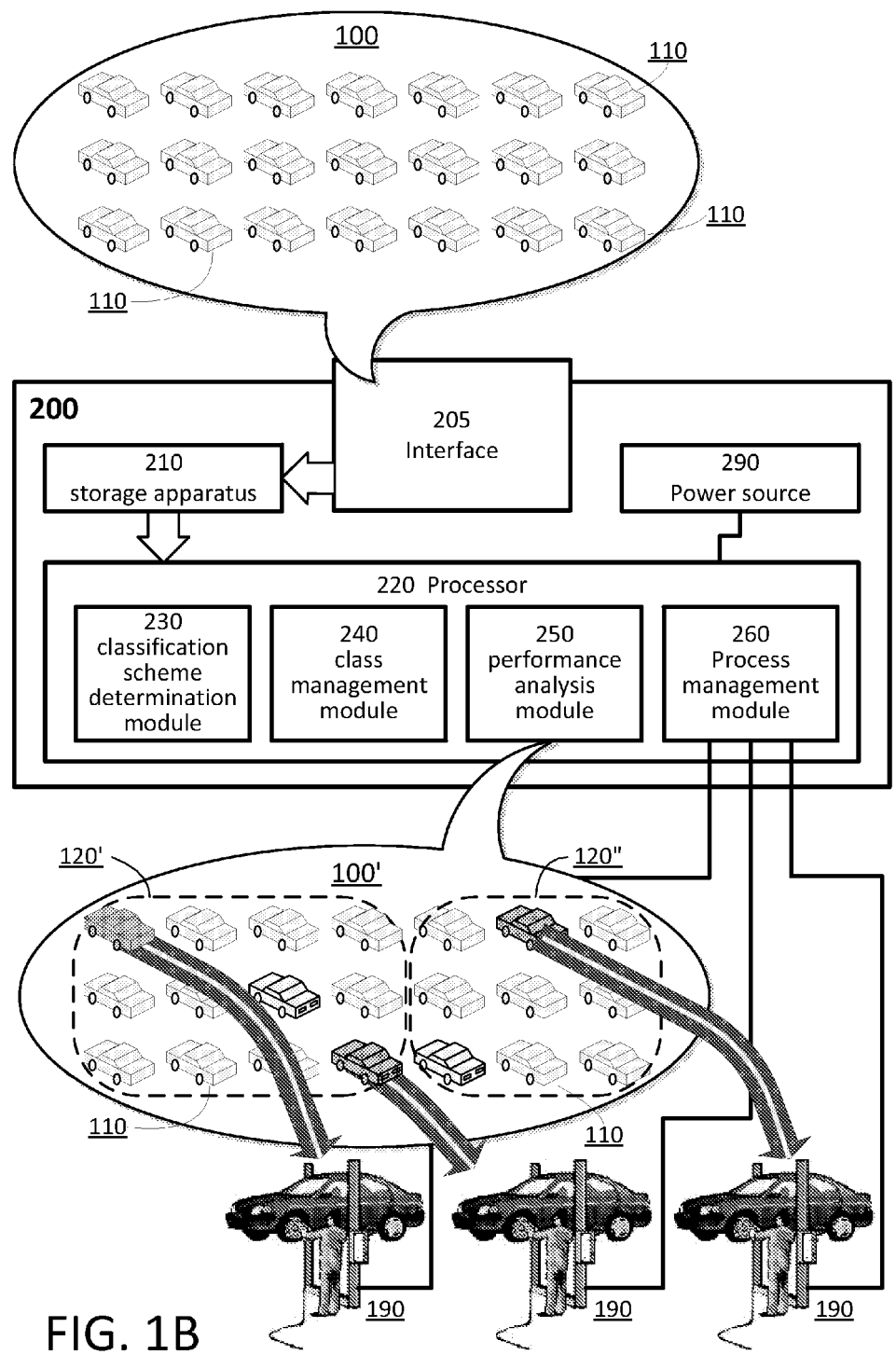
FIG. 1B illustrates an operation of the system of FIG. 1A, according to an embodiment of the invention.

FIG. 1B illustrates an operation of the system of FIG. 1A, according to an embodiment of the invention, and is discussed below, after the discussion of method 500.

Figure 2:
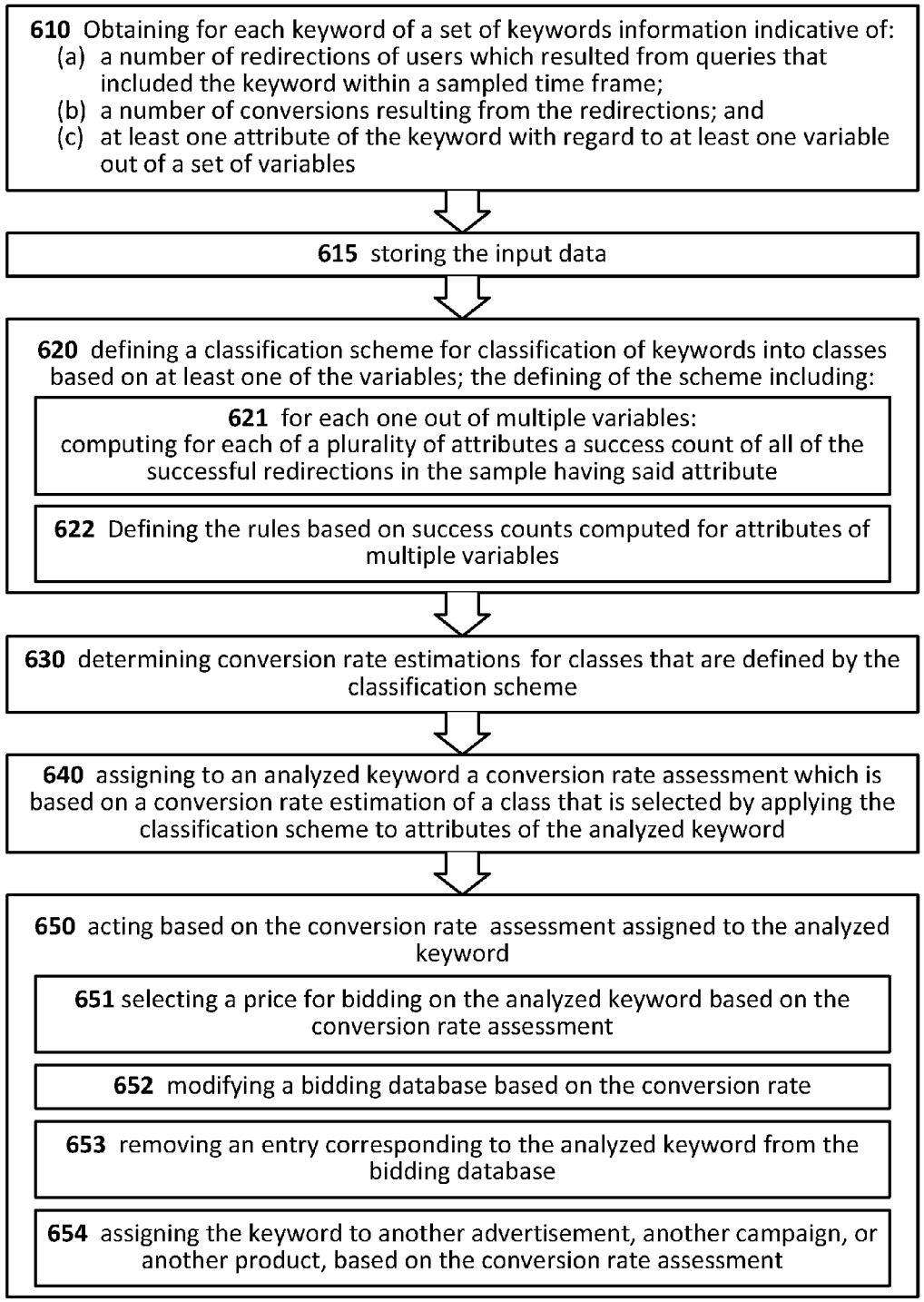
FIG. 2 illustrates a computerized classification method, according to an embodiment of the invention.

FIG. 2 illustrates computerized classification method 600, according to an embodiment of the invention. It should be noted that method 600 is a potential implementation of method 500 which is discussed below. The discussion of the more general method 500 is believed to be more easily understood in view of the discussion of method 600, and therefore this discussion is presented prior to the discussion of method 500.

Classification method 600 is a variation of method 500 which is used to classify keywords into classes, and to determine for those classes conversion rate estimations (which may later be put to use). Each numbered stage of method 600 corresponds to an equivalent stage of method 500 whose number is smaller by 100. For example, stage 610 is an implementation of stage 510, and so forth.

Referring to the examples set forth in the previous drawings, method 600 may be executed by a system such as system 200. Embodiments, variations and possible implementations discussed with relation to method 600 may be applied to system 200 mutatis mutandis even if not explicitly elaborated, and vice versa.

Method 600 may start with stage 610 which includes obtaining input data. It should be noted that the input data may be generated as part of method 600, and/or may be received from an external system. Stage 615 includes storing the input data in a storage apparatus (e.g. one or more magnetic disks). Since stages 610 and 615 pertain to the same type of data (even though not all of the input data which is generated in stage 610 is necessarily stored in stage 615 or used in further stages of method 600), variations regarding the input data will be discussed in relation to stages 610 and 615 together. Referring to the examples set forth in the previous drawings, stage 610 may be carried out by an interface such as interface 205, and stage 615 may be carried out by a storage apparatus such as storage apparatus 210.

The input data pertains to a set of keywords, and to usage information which pertains to the keywords of the set. For example, the set of keywords may include the keywords which are selected by an advertiser for bidding in electronic commerce advertising.

When a user searches on a search engine (e.g. Google) using a search phrase, advertisements (which are also referred to as "creatives") which are selected based on the search phrase of the user are presented to the user along with the search results. For example, the advertisement may appear as "sponsored links" and/or above or intertwined with the main search results. The advertisements are selected based on several additional parameters other than the search phrase. For example, one of the most prominent parameters for selection of an advertisement to be presented to the user in many current implementations is the sum of money different advertisers are willing to pay for their advertisements to be presented (e.g. as a part of a bidding process).

The advertiser may wish that a single advertisement would be triggered for different search phrases used by the user of the search engine. For example, the advertisement may be for an advertisement promoting discounted telephone services to be triggered for the search phrases "cheap phone", "cell phone", "calling to the UK", and "overcoming overdraft". Nevertheless, in many cases the advertiser would not be willing to pay the same price for the presenting of that advertisement in all cases. The advertiser may be willing to pay for the advertisement to be presented if it is triggered for keywords which are more likely to yield an income (e.g. by a direct purchase of a product by the user, or by the user joining a loyalty club).

Assessing for different keywords the likelihood that a user which clicked an advertisement (triggered by the keyword) would eventually end up purchasing an item from the advertiser is therefore useful for the process of bidding on different keywords. A single advertisement may be associated with a vast number of potential keywords (e.g. tens of thousands), and assessing this likelihood for such a number of keywords may be a complex process.

All the more so, out of all of the potential keywords which are selected by the advertiser for triggering a given ad, some may be used quite infrequently by the users of the search engine (and even not used at all). For example, the advertiser may be willing to bid on the keyword "telephone call to UK" (which includes a typo), but this given keyword may not be used at all by users of the search engine. Nevertheless, in order for this keyword to trigger presentation of an ad of the advertiser, the latter has to indicate the maximum bid for this keyword (or at least one of the top bids for the keyword, e.g. in situations in which there is more than one winner of the bidding process, and/or when the bidding is not the only criterion by which one or more winners of the bidding process are selected).

Bidding on such keywords (which are rarely or never used by users) may be facilitated by estimating the potential conversion rate of such keywords (e.g. the rate of purchases out of all of the times an advertisement was clicked by users).

Assessing the performance of different keywords (whether widely or rarely used) may be based on performance of various keywords within a sampled time frame (e.g. a week). For example, table 1 illustrates the performance of various keywords associated with a creative advertising discounted telephone service within a week in an imaginary search engine. In addition to the performance of the keywords (or of the advertisement as triggered based on usage of the different keywords), table 1 further includes additional information for each of the keywords (e.g. first character of the keyword, its length, and a match type which indicates the type of matching of the keyword used in the search). The additional information may be fixed (e.g. the length of the keyword is inherent) and/or change with time (e.g. the external entity may modify information regarding the frequency in which the keyword was used by its users).

TABLE 1

| | Match type | First Char | Length (char) | Times an ad was displayed | Times an ad was clicked | Times a purchase was made |
|---|---|---|---|---|---|---|
| cheap phone | Phrase | C | 11 | 12 | 2 | 0 |
| cell phone | Phrase | C | 10 | 101 | 8 | 1 |
| calling to the UK | Phrase | C | 17 | 82 | 5 | 1 |
| alling to the UK | Broad | A | 16 | 0 | 0 | 0 |
| ... | ... | ... | ... | ... | | |
| overcoming overdraft | Exact | O | 20 | 23 | 3 | 2 |

Stage 615 includes storing in the storage apparatus information pertaining to each keyword of the set of keywords, the information being indicative of:
- a number of redirections of users which resulted from queries that included the keyword within a sampled time frame (e.g. a number of times in which users clicked advertisements presented in response to queries that included that keyword within a sampled time frame);
- a number of conversions resulting from the redirections (e.g. a number of purchases made by users following such clicks within the sampled time frame); and
- at least one attribute of the keyword with regard to at least one variable out of a set of variables (e.g. the first letter of the keyword, a match type assigned to it, and so on).

Stage 610 may include receiving this information for some or all of the keywords of the set. It should be noted that the stored information is indicative that at least one of the keywords is associated with multiple redirections (either by a single user or by several users).

The set of keywords may be all of the keywords on which an advertiser is willing to bid. For example, in a pay-per-click (PPC) advertising model, advertisers select the keywords that should trigger their ads and the maximum price they will pay per click. When a user searches the search engine (e.g. Google), ads of one or more advertisers that bid on the relevant keywords may be presented to the user (e.g. as "sponsored links").

In such a scenario, actual biddings may be made on some or all of the keywords of the set of keywords, and the performance of those words may be recorded over a sampled time period—such as an hour, a day, a week, a month, etc. The performance data recorded for each keyword may include the information indicative of the number of times in which users clicked advertisements presented in response to queries that included that keyword within a sampled time frame, and of the number of purchases made by users following such clicks within the sampled time frame. While the obtained information may include for each keyword the actual number of occurrences ("clicks") and the actual number of conversions, it may also include information from which those numbers can be inferred (e.g. the observed conversion rate and the number of clicks).

The variables for which attributes are obtained for the different keywords may vary in different implementations of method 600. Some such variables are indicated in table 1 (as well as in table 2B), as an example. The attributes may be defined by a person and/or by a machine. For example, a person may define the attributes indicated in table 1, and the computer may generate from these attributes additional attributes (e.g. the multiplying of the number of the vowels in the keyword by its length may serve as an additional attribute). It is noted that the attributes of the keywords may be common metrics which are used in electronic advertising (such as match type), and may also be metrics devised specifically for a given implementation.

Stage 620 of method 600 includes defining a classification scheme. For example, the classification scheme may include one or more classification rules (therefore, the term "classification rules" is also used to refer to the classification scheme). The classification scheme defined in method 600 may be used for classification of keywords into classes, wherein each keyword is classified into one (or more) of the classes based on its attributes with regard to at least one of the variables of the aforementioned set of variables. The number of classes may be a predetermined number, or may be determined during the process of defining. Referring to the examples set forth in the previous drawings, stage 620 may be carried out by a classification scheme determination module such as classification scheme determination module 230.

The defining of the calibration scheme in stage 620 includes at least stages 621 and 622. Stage 621, which is repeated for each one out of a plurality of variables, includes computing for each out of a plurality of attributes of one of the variables a success count of successful redirections in the sample which are associated with said attribute. Optionally, stage 621 includes computing a success count of all of the successful redirections in the sample which have said attribute.

For example, in the example of table 1 the success count of the attribute "consonant" of the variable "First Char" would be 2 (0+1+1, of the first three keywords). Continuing the same example, the reader may have noticed that the attribute "consonant" is not explicit in Table 1. However, the attributes of the variable may be divided into multiple subsets of attributes, wherein each of the set of attributes may be considered as an attribute in itself. Another way to look at it is computing for each keyword an attribute for a new variable (e.g. "Is First Char a Vowel?") based on the attributes of another variable (in this case "First Char"). Therefore, in the following discussion, a single attribute may be replaced by a subset of attributes, when applicable.

As explained in more detail with respect to method 800, the success count may pertain to only a subsample of the entire sample, and not to the entire sample. For example, the success count of a first attribute may be calculated for a subset of the sample which is characterized by having another attribute.

As illustrated by stage 622, the defining of the classification scheme in stage 620 is based on success counts computed for attributes of multiple variables. Some of the ways in which stage 620 may be implemented are discussed below in more detail, e.g. with respect to FIG. 5A.

Figure 4A:
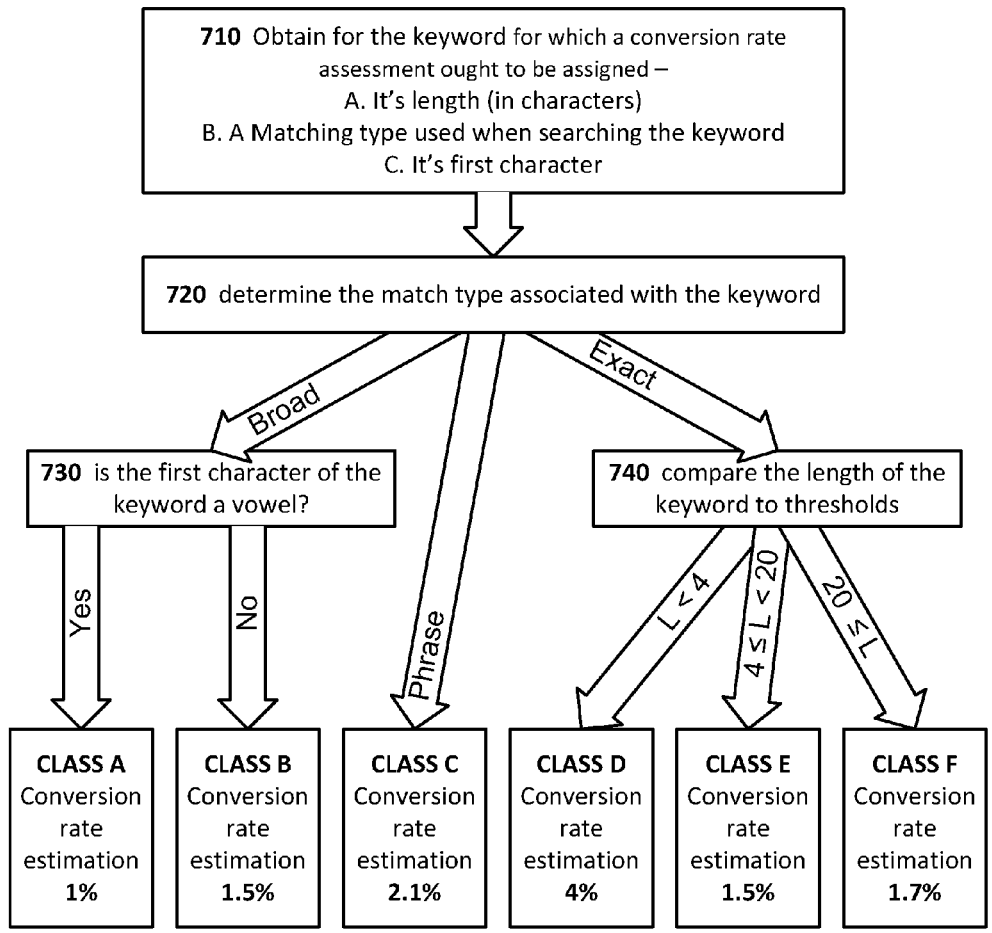
FIGS. 4A and 4B illustrate various classification schemes which may be determined in an implementation of the aforementioned methods, according to various embodiments of the invention.

An example of a classification scheme which may be defined in stage 620, according to an embodiment of the invention is provided in FIG. 4A, in which the conversion rate estimations which are determined in stage 630 are also illustrated (in classes A through F). FIG. 4A illustrates classification scheme 700, which is an example of a classification scheme that may be determined in an implementation of method 600, and especially in stage 620 thereof, according to an embodiment of the invention. The attributes used in method 700 (e.g. in 720, 730, 740, and 750 of FIG. 5B) which are obtained at stage 710, may be some or all of the attributes obtained in stage 610.

While classification scheme 700 is illustrated in a tree form, this is only one example, and other types of classification schemes may be implemented. In another example, the classification scheme may be a formula whose parameters are some of the variables and which yields a numerical value, and the classification is enabled by comparison of the numerical value yielded for the attributes of a given item to thresholds. Other implementations may utilize yet other forms of classification schemes, many of which are known in the art.

In stage 710 of the classification process, some attributes are obtained for the keyword for which a conversion rate assessment ought to be assigned.

In stage 720, the attribute for the match type variable of the keyword is analyzed (e.g. the matching type used when searching the keyword in an external search engine, such as Google Adwords "Match type" which can receive the attributes "Broad match", "Phrase match", "Exact match"). In some cases, a single attribute may be sufficient for finding the conversion rate estimation. This is illustrated by the arrow indicating the match type which it is equal to.

In other cases, either stage 730 or stage 740 is carried out, based on the match type of the keyword. For a match type which is equal to "Broad match", stage 730 is carried out, in which the conversion rate estimation may be selected based on the first word of the keywords. For a match type which is equal to "Exact match", stage 740 is carried out, in which the conversion rate estimation may be selected based on the length of the keyword.

As illustrated, not all attributes are necessarily required for classification of all items, and different items may be classified using different attributes. In the illustrated example, two attributes are used for classes A and B (match type and first character) and for classes D, E, and F (match type and length), while only one attribute (match type) is used for items which are classified to class C.

Reverting to method 600, it is noted that the classification scheme defined in stage 620 may be applied in a manner equivalent to a tree-like classification scheme like those exemplified in FIG. 4A, but this is not necessarily so.

The defining of the classification scheme may be irrespective of a success rate of any item of the set of items (that is, the ratio between the quantity of successful occurrences of any item and its quantity of overall occurrences, is not used in the process).

Stage 630 of method 600 includes determining conversion rate estimations for classes that are defined by the classification scheme. Some ways in which the conversion rate estimations of the different classes (such as those illustrated in FIG. 4A) may be determined are discussed below. Referring to the examples set forth in the previous drawings, stage 630 may be carried out by a class management module such as class management module 240.

It should be noted that the applying the classification scheme to a keyword (based on its attributes) results in a selection of one (or more) out of a finite number of classes, to which conversion rate estimations are determined in stage 630.

The conversion rate estimation determined for each class may later be put to use for assigning to keywords performance assessments which are based on the conversion rate estimations of the respective classes to which such keywords are classified. For example, the conversion rate estimation of each class may be a number between 0 and 1, and for each keyword a conversion rate assessment of that keyword may be assigned, based on the conversion rate estimation determined to the class.

The determining of the conversion rate estimation for a class in stage 630 may be based on the number of clicks of some or all of the keywords in that class. For example, the determining of the conversion rate estimation for a class in stage 630 may be based on the sum of clicks of all of the keywords of the sample which are classified to that class based on the classification scheme.

The determining of the conversion rate estimation for a class in stage 630 may also be based (in addition to the formerly discussed number of occurrences of keywords in the class, or regardless thereof) on a count of multiple keywords in that class (which are classified to that class by applying the classification scheme to the attributes of those keywords). For example, while all of the keywords which are classified to that class based on the classification scheme may be counted in that count, in another implementation only keywords that have non-zero number of clicks (and possibly all of them) are counted.

A more detailed discussion of some of the ways in which the conversion rate estimation may be determined in stage 630 is provided with respect to stages 530 and 830 of methods 500 and 800 correspondingly. This discussion is not repeated with respect to method 600 for reasons of brevity only, and the variations discussed with respect to stages 530 and/or 830 may be implemented in stage 630, mutatis mutandis.

While not necessarily so, the determining of the conversion rate estimation in stage 630 may be irrespective of data pertaining to keywords of the sample which are not included in that class. As is discussed below in greater detail (especially with respect to method 500), method 600 may also include determining additional parameters for classes that are defined by the classification scheme, based on information of keywords of the samples which are classified to the respective classes.

Stage 640 of method 600 includes assigning to an analyzed keyword a conversion rate assessment which is based on the conversion rate estimation of one of the classes. The conversion rate estimation which is used is the one that is determined in stage 630 to the class which results from application of the classification scheme to attributes of the analyzed keyword. Referring to the examples set forth in the previous drawings, stage 640 may be carried out by a performance analysis module such as performance analysis module 250.

For example, if the analyzed keyword (e.g. "car") has a match type that is equal to "Exact match", and its length is just three characters, applying the classification scheme illustrated in FIG. 4A to that keyword would result in classifying that keyword to class D, for which the conversion rate estimation of 4% was determined in stage 630.

The conversion rate assessment which is assigned to that keyword in stage 640 may be equal to the conversion rate estimation of 4%, but this is not necessarily so. For example, since the word "car" is expected to be repeated many times in the sample, it may occur in the sample a significant number of times (e.g. 50,000), and have a relatively large number of conversions (e.g. 2,500). In such a case, a crude conversion rate of that keyword, as reflected in the obtained data, is 5%. In such a case, the conversion rate assessment which is assigned to that word may be some form of average between those two values—e.g. 4.6%.

Referring to an example in which the set of keywords includes all of the keywords on which an advertiser is willing to bid (with respect to one or more creatives), a conversion rate assessment may be assigned to each of those keywords. Conversion rate assessments may also be assigned to other keywords which are not part of the set. For example, if a given keyword which includes four separate words in a given order (e.g. "calling cheap from India") is assigned a very high conversion rate assessment, the method may include generating other variations of this keyword in which the words are in different order (e.g. "cheap calling from India") or with somewhat different words (e.g. "India calling cheap" or "calling cheap from Delhi"), and assessing the conversion rate of those variations in stage 640.

It is noted that execution of stage 640 (for one or more of the keywords of the sample, and/or to another one or more keywords) enables a selective application of an industrial process, wherein the selective application of the industrial process is responsive to the performance assessment.

Optional stage 650 includes acting based on the conversion rate assessment assigned to the analyzed keyword. For example, stage 650 may include executing one or more of stages 651 through 654.

Stage 651 includes selecting a price for bidding on the analyzed keyword based on the conversion rate assessment (and possibly on other parameters as well).

Stage 652 includes modifying a bidding database based on the conversion rate assessment (e.g. based on the price selected in stage 651). Stage 652 may include updating an entry that is associated with the analyzed keyword in a bidding database based on the conversion-rate assessment, e.g. thereby facilitating cost reduction in a bidding process that depends on the analyzed keyword.

Stage 653 includes removing an entry corresponding to the analyzed keyword from the bidding database (e.g. because the conversion rate assessment assigned to this keyword is below a predetermined threshold).

Stage 654 includes assigning the keyword to another advertisement, another campaign, or another product, based on the conversion rate assessment (and possibly on other parameters as well, e.g. such as the conversion rate assessment assigned to this keyword based on a classification scheme devised for another advertisement). For example, if the conversion rate assessment assigned to the keyword "getting rid of vampires" for an advertisement for the famous book by Bram Stoker is too low, the same keyword may be assigned to an advertisement for garlic.

While method 600 is a specific implementation of method 500, it is noted that generally, in some implementations of method 500, each item is associated with certain Internet content; each occurrence of an item correspond to a visiting of the certain Internet content associated with the item by a user, and each successful occurrence of the item corresponds to a visiting of the certain Internet content by a user which results in reception of an acceptance indication from the user.

Figure 3:
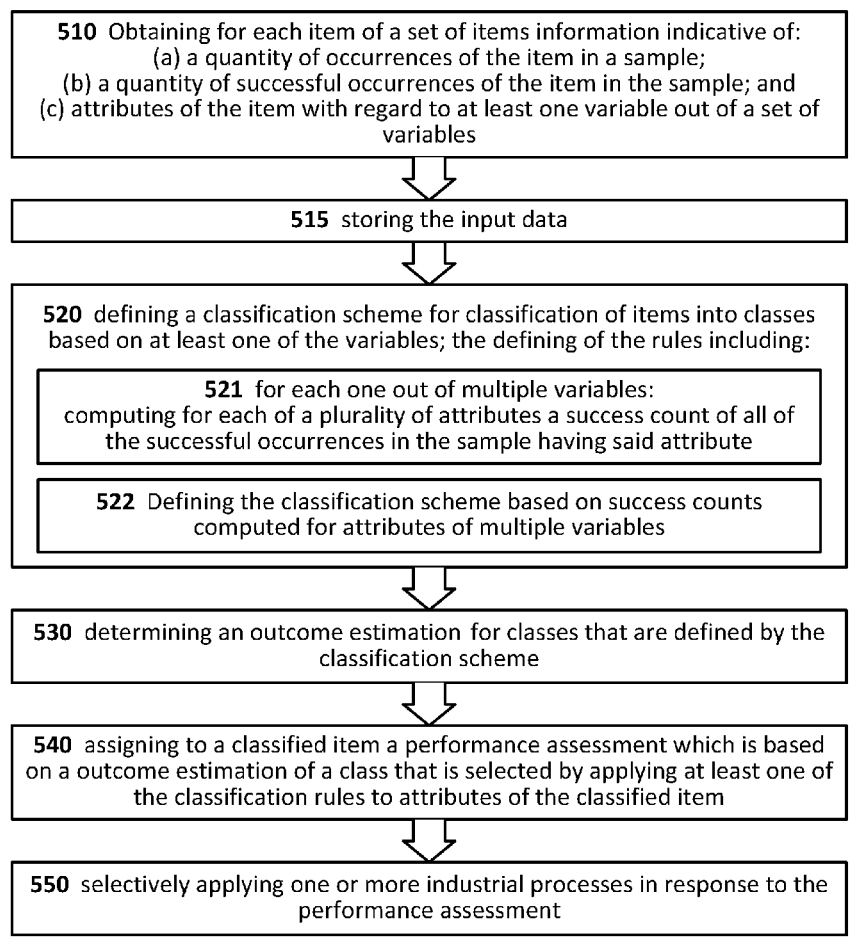
FIG. 3 illustrates a computerized classification method, according to an embodiment of the invention.

FIG. 3 illustrates computerized classification method 500, according to an embodiment of the invention. Referring to the examples set forth in the previous drawings, method 500 may be executed by a system such as system 200. Embodiments, variations and possible implementations discussed with relation to method 500 may be applied to system 200 mutatis mutandis even if not explicitly elaborated, and vice versa.

Referring to the examples set forth in the previous drawings, method 500 may be carried out by system 200. Different embodiments of system 200 may implement the various disclosed variations of method 500 even if not explicitly elaborated. Likewise, different embodiments of method 500 may include stages whose execution fulfills the various disclosed variations of system 500, even if succinctness and clarity of description did not necessitate such repetition.

Some of the stages of method 500 refer to a set of items and to information associated with each of these items, and to a classification scheme which is defined based on the information associated with the items of the set. This classification scheme may be applied to classify items of the set, and may possibly also be applied for classification of other items.

In some implementations, method 500 may be used for inferring a classification scheme from training data which consist of a set of training examples. However, as is demonstrated below in more detail, the different items of the training set are not necessarily associated with a desired output value.

In different implementations of the invention, different type of items (and hence of associated information) may be used, to determine classification schemes which correspond to different types of classification. For example, the items of the set may be all of the cars in a fleet of a car rental company, and the training data may include attributes of each of the cars (year of manufacture, type of engine, and the number of times a timing belt of the car required replacement). The classification scheme may be used for classifying cars into classes which are indicative of an expected number of times (possibly a fractional number) in which a cylinder head of a car is expected to be replaced within the next two years. This is exemplified in FIG. 1B, discussed below.

In another example, the items of the set may be search queries, the training data may include data pertaining to the performance of the search queries in electronic advertising (e.g. click-through rate, conversion rate) and information regarding the search queries (e.g. length of the query), and the classification scheme may be used for classifying search queries into classes which are indicative of an expected conversion rate of the search query. By way of example, method 600 discussed above may be such an implementation of method 500.

Method 500 may be utilized in a wide range of fields, and the examples provided are provided as illustrative examples only, and are not intended to limit the scope of the invention in any way.

Method 500 may start with stage 510 which includes obtaining input data. It should be noted that the input data may be generated as part of method 500, and/or may be received from an external system. Stage 515 includes storing the input data in a storage apparatus (e.g. one or more magnetic disks). Since stages 510 and 515 pertain to the same type of data (even though not all of the input data which is generated in stage 510 is necessarily stored in stage 515 or used in further stages of method 500), variations regarding the input data will be discussed with relation to stages 510 and 515 together. Referring to the examples set forth in the previous drawings, stage 510 may be carried out by an interface such as interface 205, and stage 515 may be carried out by a storage apparatus such as storage apparatus 210.

Stage 515 includes storing in the storage apparatus information pertaining to each keyword of the set of keywords, the information being indicative of:
- A quantity of occurrences of the item in a sample;
- A quantity of successful occurrences of the item in the sample; and
- One or more attributes of the item with regard to at least one variable out of a set of variables.

Stage 510 may include receiving that information for some or all of the keywords of the set. It should be noted that the stored information is indicative that at least one of the keywords is associated with multiple redirections (either by a single user or by several users).

It should be noted that the obtained information may explicitly include the quantity of occurrences of the item in the sample, the quantity of successful occurrences of the item in the sample, and/or the attributes of the item, but may alternatively include information from which such data may be inferred. For example, the obtained information may include the quantity of occurrences of the item in the sample and the ratio of successful occurrences out of those, and the quantity of successful occurrences may be inferred by multiplying those two numbers.

The set of items may also be referred to as the "training set", and may include items of one or more types. Without limiting the scope of the invention, a few examples of implementations of the sample are: some or all of the events occurred in real life within a predetermined span of time (with or without filtering those based on some qualification criterion), may pertain to all of the items in a collection (e.g. all of the cars which are currently operated by a car rental company), may be a computer generated sample (e.g. a result of a simulation, of a so-called Monte Carlo random sample generation), and so forth.

Each of the items of the sample has a quantity of occurrences which is associated with it. For example, for a sample of search query strings, the quantity of occurrences may be equal to the number of times the respective search query was used by users of a given search engine in a sampled period of time (e.g. a given week). In another example, for a sample of cars, the number of occurrences may be the number of times each car had to be sent to a central garage—either in a given time span (e.g. last business year) or regardless of such a time span (e.g. since the manufacturing of each respective car).

The quantity of occurrences may be a positive integer, and may also be a non-negative integer (for example, it is possible that some of the search queries were not used during the sampling duration or that a car was not sent to the central garage). In some implementations of the invention, quantity of occurrences which are non-integer and/or negative may also be used, mutatis mutandis.

Furthermore, the information obtained may include information indicative of more than one quantity of occurrences for some or all of the items, which pertain to different kinds of occurrences. Continuing the example of sample of cars, one counter of occurrences may be used for the number of times the car had to be sent to the central garage, while another counter may pertain to the number of times the car traveled 10,000 kilometers.

As aforementioned, the information obtained for each of the items of the set further includes information indicative of the quantity of successful occurrences of the item. Successful occurrences may be, for example, occurrences of the item that fulfill a condition that is indicative of an outcome of the occurrence.

For example, if the quantity of occurrences of a given search query is understood to be the number of times that this search query was used by users of the search engine during the duration of the sampling and which resulted in a displaying of a selected advertisement to those users as a result, the quantity of successful occurrences may be the number of times out of those occurrences in which the respective user clicked the advertisement, and was transferred to another website as a result (this is also referred to as the number of click-throughs). In another example, the quantity of occurrences is equal to the number of click-throughs, and the number of successful occurrences is the number of times out of those occurrences in which the respective user ended up purchasing an item from the website, after being directed to that website by the advertisement.

However, the term "successful occurrence" is used as a matter of convenience, and it may also be applied to occurrences which would not be considered successful. For example, if each item is a car in a fleet of cars, and the quantity of occurrences is the number of times in which that car was sent to the central garage, the quantity of successful occurrences may be the number of times out of those occurrences in which that car required a cylinder head replacement. In other examples, the quantity of successful occurrences may be used as a count of events which are considered as failures (e.g. number of deaths out of occurrences which are heart attacks).

The term "successful occurrence" may be indicative of an outcome of the occurrence (regardless of whether it is considered a success, a failure, desired or undesired, or whether no such qualifier is used). This usage is similar to the usage of the term "Success" in the definition of Bernoulli distribution.

The quantity of the so-called successful occurrences may be a positive integer, and may also be a non-negative integer (for example, it is possible that some of the search queries which were used during the sampling duration did not result in any purchase made by the respective user or users). In some implementations of the invention, quantity of occurrences which are non-integer and/or negative may also be used, mutatis mutandis. The term "successful occurrence" may be used to refer to occurrences whose result qualified at least one qualification rule.

It should be noted that optionally, there may be a connection between different occurrences (either of the same item or of different items). For example, successful occurrences may be connected to former non-successful occurrences. For example, in the field of electronic advertising in social media, a first click by a user which leads to referring of the user to a website of the marketer may not yield a purchase, but a second time in which the user is referred to the website in that manner may yield such a conversion. In this example, the actual purchase of the product may result not only from the last referral but also from preceding referrals. This notion is present in techniques of attribution of conversion value, and in discussions regarding conversion funneling.

As aforementioned, the information obtained for each of the items of the set further includes information indicative of one or more attributes of the item with regard to at least one variable out of a set of variables. The set of variables may include all of the variables by which the items are characterized in the sample. Since not all of the variables of the set may be applicable to all items, and since attributes of some items with respect to some of those variables may not be available, it is noted that the obtaining of stage 510 may include obtaining to one or more of the items attributes of that item with respect to a proper subset of the variables out of the set of variables which includes (in this example) all of the variables which are used to define items in the sample.

Tables 2A and 2B represent the information obtained for two samples, according to two embodiments of the invention which serve as examples. Table 2A pertains to a set of cars of a fleet, and table 2B pertains to keywords which may be used as search queries in one or more search engines (it is noted that throughout this disclosure, the term "keyword" may also pertain to search strings which may also include spaces, non-alphabetical characters, and so on). Possibly, each of the keywords is associated with a single advertisement and/or with a single product and/or with a single landing webpage to which a browser of the user would be directed upon selection of an ad presented as a result of the search query.

TABLE 2A

| 11A | 12A Age | 13A Type | 14A Assembly Country | 15A Type of Fuel used | 16A Mileage (*10K) | 17A Visits to central garage | 18A cylinder head replaced |
|---|---|---|---|---|---|---|---|
| Car 1 | 18 | Honda | China | Diesel | 2 | 5 | 0 |
| Car 2 | 31 | Honda | China | Petrol | 3 | 2 | 1 |
| Car 3 | 17 | Honda | USA | Diesel | 4 | 2 | 0 |
| Car 4 | 3 | Ford | USA | Petrol | 2 | 0 | 0 |
| Car 5 | 27 | Ford | USA | Petrol | 1 | 1 | 0 |
| Car 6 | 12 | Ford | USA | Diesel | 0 | 0 | 0 |
| Car 7 | 9 | Toyota | Argentina | Petrol | 1 | 1 | 1 |
| Car 8 | 12 | Toyota | USA | Petrol | 5 | 1 | 1 |
| Car 9 | 5 | GM | USA | Diesel | 3 | 3 | 1 |
| Car 10 | 26 | GM | USA | Diesel | 9 | 3 | 2 |

TABLE 2B

| 11B | 12B Related product | 13B match type | 14B First Char | 15B Length (char) | 16B Times an ad was displayed | 17B Times an ad was clicked | 18B Times a purchase was made |
|---|---|---|---|---|---|---|---|
| Keyword 1 | Phone 1 | Phrase | A | 41 | 12 | 2 | 0 |
| Keyword 2 | | Phrase | Z | 5 | 100 | 8 | 1 |
| Keyword 3 | Car 1 | | A | 7 | 84 | 6 | 1 |
| Keyword 4 | Car 2 | Negative | C | 21 | 1 | 1 | 0 |
| Keyword 5 | Pliers 12 | Broad | E | 35 | 0 | 0 | 0 |
| ... | ... | ... | ... | ... | ... | ... | ... |
| Keyword N2 | Phone 1 | Exact | R | 10 | 21 | 3 | 2 |

Each of the rows of the tables 2A and 2B (except the topmost one) represents a single item of the corresponding set of items (e.g. the respective training set). The leftmost columns 11A and 11B respectively include an identifier for each of the items. The identifier may be meaningful (e.g. the search query itself, or a registration number of each car), but may also be arbitrary (e.g. as exemplified).

The following columns (12A through 16A in table 2A, 12B through 16B in table 2B) include attributes of each of the items with respect to a set of variables. As can be seen in table 2B (with respect to items "keyword 1" and "keyword 2"), for one or more of the items, attributes may obtained only for some of the variables. The second column on the right in each of the tables 2A and 2B (columns 17A and 17B respectively) indicates the number of occurrences, and the rightmost column in each of the tables 2A and 2B (columns 18A and 18B respectively) indicates the number of the so-called successful occurrences. As can be seen, some items may be associated with zero occurrences and/or with zero successful occurrences.

In the examples provided, the number of successful occurrences is remarkably low. For example, in the example of keywords which are used as search queries, the sample may include millions of possible keywords for which an advertising party is willing to bid (e.g. in a Pay Per Click (PPC) Internet advertising model in which the advertising party pays an owner of the search engine when an ad provided by the advertising party is clicked, after that advertising party bid on a keyword which it considered as relevant to its target market, and won the auction). Out of the millions of possible keywords, it is likely some of those words will not be used at all during the sampling period, some would be used but would not result in a clicking on the advertisement, and yet others would result in a click-through, but would not yield an actual purchase. In the above example involving cars, it is likely that some cars would not require any cylinder head replacement.

The defining of the classification scheme may include utilizing information about occurrences of a group of utilized items out of the set of items. As information about some items, especially those with zero occurrences, may be disregarded in some implementations, the group of utilized items may include fewer items than the sample. For samples in which at least some of the items have zero or few occurrences (i.e. are relatively scarce), a significant portion of items of the group of the utilized items may appear in the sample less than ten times.

For example, that portion may be larger than a quarter, larger than a half, larger than 80%, and so on. According to an embodiment of the invention, at least half of the items of the sample whose quantity of occurrences is larger than zero and whose information is used in the defining of the classification scheme appear in the sample less than ten times, inclusive. As in the above example, such a portion may be different than half, e.g. larger than a quarter, larger than a half, larger than 80%, and so on.

As will be demonstrated below in more detail, method 500 is useful when the quantity of successful occurrences of the various items is significantly large, and also useful when the quantity of successful occurrences of some (possibly most) of the items is low and even null—in contrast to prior art techniques.

It should be noted that the information indicative of the quantity of occurrences and/or of the quantity of successful occurrences may be used as other attributes of the items are used, in the following stages of method 500. Also, some of the information indicative of attributes of the various items may be obtained by a processing of other attributes of the item. For example, the first letter attribute as well as the length of the keyword may be obtained by a processing of the string. In another example, two match types (e.g. that of column 13B, which may be for example the match type of the Adwords system of Google, and another matching variable not illustrated) may be processed, to provide a representative match type which would then be used as an attribute).

While not necessarily so, the attributes of each item may be constant over time (or at least change in a low change rate), while its performance indications (e.g. the quantity of occurrences, the quantity of successful occurrences, and the ratio between them) may vary between two samples in which the item is sampled. For example, the length of a search query is a constant attribute, while the age of the car varies with time.

Stage 520 of method 500 includes defining a classification scheme. The classification scheme is a classification scheme for classification of items into classes, wherein each item is classified into one (or more) of the classes based on its attributes with regard to at least one of the variables of the set. Referring to the examples set forth in the previous drawings, stage 520 may be carried out by a classification scheme determination module such as classification scheme determination module 230. The number of classes may be a predetermined number, or may be determined during the process of defining. As discussed below in greater detail, the defining of the classification scheme in stage 520 includes at least assigning a score to each variable out of at least one variable, based on a plurality of quantities of successful occurrences of items, each of the quantities is a quantity of successful occurrences having a corresponding attribute out of a plurality of attributes of the variable.

The defining of the classification scheme in stage 520 includes at least stages 521 and 522. Stage 521 is repeated for each one out of a plurality of variables (i.e. some or all of the variables), wherein the plurality of variables for which stage 521 includes, according to an embodiment of the invention, the at least one variable on which the classification scheme is based. In other implementations, however, some or all of the at least one variable on which the classification scheme is based may be derived from variables which are analyzed in stage 521.

Stage 521 includes computing for each out of a plurality of attributes of one of the variables, a success count of successful occurrences in the sample having said attribute. Optionally, stage 621 includes computing a success count of all of the successful redirections in the sample which have said attribute.

TABLE 2A

| 11A | 12A Age | 13A Type | 14A Assembly Country | 15A Type of Fuel used | 16A Mileage (*10K) | 17A Visits to central garage | 18A cylinder head replaced |
|---|---|---|---|---|---|---|---|
| Car 1 | 18 | Honda | China | Diesel | 2 | 5 | 0 |
| Car 2 | 31 | Honda | China | Petrol | 3 | 2 | 1 |
| Car 3 | 17 | Honda | USA | Diesel | 4 | 2 | 0 |
| Car 4 | 3 | Ford | USA | Petrol | 2 | 0 | 0 |
| Car 5 | 27 | Ford | USA | Petrol | 1 | 1 | 0 |
| Car 6 | 12 | Ford | USA | Diesel | 0 | 0 | 0 |
| Car 7 | 9 | Toyota | Argentina | Petrol | 1 | 1 | 1 |
| Car 8 | 12 | Toyota | USA | Petrol | 5 | 1 | 1 |
| Car 9 | 5 | GM | USA | Diesel | 3 | 3 | 1 |
| Car 10 | 26 | GM | USA | Diesel | 9 | 3 | 2 |

For example, in the example of table 2A the success count of the attribute "USA" of the variable "Assembly country" would be 4 (0+0+0+0+1+1+2, of cars 3, 4, 5, 6, 8, 9, and 10, all of which assembled in the USA according to table 2B). As mentioned with respect to method 600, the attributes of any of one or more of the variables may be divided into multiple subsets of attributes, wherein each of the set of attributes may be considered as an attribute in itself. Another way to look at it is computing for each item an attribute for a new variable (e.g. "Age (years)") based on the attributes of another variable (e.g. "Age (months)"). Therefore, in the following discussion, a single attribute may be replaced by a subset of attributes, when applicable.

As explained in more detail with respect to method 800, the success count may pertain to only a subsample of the entire sample, and not to the entire sample. For example, the success count of a first attribute may be calculated for a subset of the sample which is characterized by having another attribute.

Reverting to the example of Table 2B, the attributes of the variable "age" indicated in column 12A of table 2A are indicative of the ages of the respective cars, truncated to whole months. A division of these attributes into multiple subsets of attributes may include the following subsets: (a) all cars whose truncated age is less or equal to 6 months; (b) all cars whose truncated age is more than 6 months and less or equal to 12 months; (c) all cars whose truncated age is more than 12 months and less or equal to 24 months; and (d) all cars whose truncated age is more than 24 months. In an execution of stage 521 of this variable in the given example, a success count would be computed for each out of two or more of those subsets (a) through (d).

Table 3 shows (in column 24) the success count computed for the subsets (a) through (d), for the exemplary sample of table 2A. The success count is the sum of all of the successful occurrences in the sample whose age attribute is included within the defined subset of attributes (indicated in column 22). Optionally, another count which may be computed as part of stage 520 (e.g. as part of stage 521) is an occurrences count for an attribute (or a set of attributes), which is the sum of all of the occurrences in the sample having said attribute (or whose attribute for the given variable (in this case—age) is within the respective subset of attributes).

TABLE 3

| 21<br>Subset<br>name | 22<br>Age sub-<br>range | 23<br>Total visits<br>to central<br>garage | 24<br>Success count (Total<br>occurrences of cylinder<br>head replacement) |
|---|---|---|---|
| (a) | 0-6 | 3 | 1 |
| (b) | 7-12 | 2 | 2 |
| (c) | 13-24 | 7 | 0 |
| (d) | 24< | 6 | 3 |

The subsets of attributes of the variable may be disjoint sets (as in the example above), but in other implementations some of the subsets may share one or more attributes. Also, in some implementations, occurrences which belong to some of the subsets may be distributed randomly (or otherwise) to other subsets. For example, if a first subset of attributes which is based on a length of a query includes lengths between one and nine characters, and a second subset of attributes includes lengths which are larger than ten characters, the occurrences of keywords whose lengths are equal to exactly ten characters may be divided between the first and the second subsets.

Reverting to FIG. 3, as illustrated by stage 522, the defining of the classification scheme in stage 520 is based on success counts computed for attributes of multiple variables. Some of the ways in which stage 520 may be implemented are discussed below in more detail, e.g. with respect to method 800. It should be noted that the classification scheme may be a deterministic classification scheme (in which items having similar attributes would always be treated the same), but this is not necessarily so.

Stage 530 of method 500 includes determining outcome estimations for classes that are defined by the classification scheme (e.g. one outcome estimation for each of the classes). It should be noted that applying the classification scheme to an item (based on its attributes) results in a selection of one (or more) out of a finite number of classes, to which outcome estimations are determined in stage 530.

The determining of the outcome estimations in stage 530 may include, be preceded by, or otherwise be based on a stage of applying the classification scheme to attributes of a plurality of items of the set (possibly to all of them), thereby obtaining for each out of a plurality of the classes a respective subset of the plurality of items. Variations of this stage are equivalents to those discussed with respect to stage 831 of method 800.

While the classification scheme may be used to define classes whose included items (in a single class) share something more than being included in a class to which a certain outcome estimation is assigned, this is not necessarily so. The former situation may be exemplified by the classification scheme, in which different classes include items whose first letter belongs to different subsets of the alphabet. In another example, all of the items of a class may have similar performance (e.g. similar conversion rate). However, in other implementations this is not so. All the more so, even though a single outcome estimation is assigned to a class, that class may include items whose performance yields very different outcomes.

The outcome estimation determined for each class may be used to assign to items which are classified according to the classification scheme performance assessments which are based on the outcome estimation of the class to which each of those items it was classified. For example, in the example of keywords used in a search engine, the outcome estimation of each class may be a number between 0 and 1, and for each item a performance assessment which may be used as an assessment of the conversion rate of that keyword may be assigned, based on the numerical outcome estimation determined to the class. Referring to the examples set forth in the previous drawings, stage 530 may be carried out by a class management module such as class management module 240.

The determining of the outcome estimation for a class in stage 530 may be based on the number of occurrences of some or all of the items in that class. For example, the determining of the outcome estimation for a class in stage 530 may be based on the sum of occurrences of all of the items of the sample which are classified to that class by application of the classification scheme.

The determining of the outcome estimation for a class in stage 530 may also be based (in addition to the formerly discussed number of occurrences of items in the class, or regardless thereof) on a count of multiple items in that class (which are classified to that class by applying the classification scheme to the attributes of those items). For example, while all of the items which are classified to that class based on the classification scheme may be counted in that count, in another implementation all and only items that have non-zero number of occurrences, are counted.

A more detailed discussion of some of the ways in which the conversion rate estimation may be determined in stage 530 is provided with respect to stage 830 of method 800. This discussion is not repeated with respect to method 500 for reasons of brevity only, and the variations discussed with respect to stage 830 may be implemented in stage 530, mutatis mutandis.

While not necessarily so, the determining of the outcome estimation in stage 530 may be irrespective of data pertaining to items of the sample which are not included in that class.

As will be discussed below in greater detail, method 500 may also include determining additional parameters for classes that are defined by the classification scheme, based on information of items of the samples which are classified to the respective classes.

Optional stage 540 of method 500 includes assigning to an analyzed item a performance assessment which is based on a performance estimate of a class out of the classes that is a result of an application of the classification scheme to attributes of the analyzed item. Referring to the examples set forth in the previous drawings, stage 540 may be carried out by a performance analysis module such as performance analysis module 250.

The assigning of the performance assessment to the analyzed item is based on both the classification scheme defined in stage 520 and on an outcome estimation determined in stage 530. For example, the classification scheme may be utilized for selecting the respective class by applying the classification scheme to the attribute of the aforementioned analyzed item. The outcome estimation of this class is then used in the determination of the performance assessment to be assigned to the analyzed item. In a sense, the classes may be considered as performance-indicative classes, since the outcome estimation which is associated with such a class is used in stage 540 to determine the performance assessment of the analyzed item which is classified to that class. While the performance assessment assigned to the analyzed item may be equal to the outcome estimation of the respective class, this is not necessarily so. In other implementations, that performance assessment may be based on additional parameters, such as attributes of the analyzed item.

It should be noted that stage 540 does not necessarily include direct application of the classification scheme to the attributes of the analyzed item. For example, stage 540 may be preceded by generating a performance assessment assignment scheme, based on the classification scheme. By way of example, the classification scheme includes a rule which states "if an item has attributes A1, B1, and C1 (of variables A, B, and C correspondingly), classify that item to class Q". Assuming that in stage 530 an outcome estimation of 5% was determined for class Q, the generating of the performance assessment assignment scheme may include determining a performance assessment assignment rule stating: "if an item has attributes A1, B1, and C1 (of variables A, B, and C correspondingly), assign to that item the performance assessment 5%", or "if an item has attributes A1, B1, and C1 (of variables A, B, and C correspondingly), determine for that item a performance assessment which is a weighted average of 5% and the performance of that item in the sample".

Stage 540 may include assigning a performance assessment to an item which is included in the training set, and may also include assigning a performance assessment to an item which is not part of the training set. Stage 540 may be repeated for assigning performance assessments to multiple analyzed items. For example, stage 540 may be repeated to assign performance assessments to all of the items in the sample, and possibly to other non-training items as well.

The performance assessments (as well as the outcome estimations) may have different meanings in different implementations. For example, in the example of items which are cars of the fleet, the performance assessment may be indicative of an assessed likelihood that the analyzed item car would require a cylinder head replacement procedure in the future. In the example in which the items of the sample are keywords which may be used to query a search engine, the performance assessment may be a conversion rate.

In Internet marketing, conversion rate is the ratio of visitors who convert casual content views or website visits into desired actions based on subtle or direct requests from marketers, advertisers, and content creators. Examples of conversion actions might include making an online purchase or submitting a form to request additional information. The conversion rate may be defined as the ratio between the number of goal achievements (e.g. number of purchases made) and the visits to the website (which resulted from ads displayed in response to the specific keywords). For example, a successful conversion may constitute the sale of a product to a consumer whose interest in the item was initially sparked by clicking a banner advertisement.

It should be noted that a quantity of occurrences and a quantity of successful occurrences is obtained for each of the items. Therefore, in at least some implementation, a crude performance assessment may be derived regardless of the classification scheme and classes. For example, in the example of table 2B, each keyword has information regarding the times an ad resulting from the keyword was clicked by a user of the search engine, and the number of times out of those in which the user ended up making a purchase in the website to which he was referred. Therefore, the ratio between those two numbers may be regarded as a crude assessment of a conversion rate. However, for items with a relatively small number of occurrences, such a ratio may not be statistically significant.

In contrast, the outcome estimation of the class may be determined based on parameters which pertain to multiple items—such as some or all of the items of the training set which are classified to that class according to the classification scheme (e.g. the number of occurrences of the items classified to that class and a count of the items classified to that class which have more than one occurrence in the sample).

Method 500 may also include stage 550 of selectively applying one or more industrial processes in response to the performance assessment. Clearly, in different embodiments of the invention, different industrial processes may be applied. For example, stage 550 may include applying any combination of one or more of the following industrial processes:

A chemical industrial process (e.g. applying to the item an acid whose pH level is selected and/or manipulated based on the performance assessment, etc.);

A mechanical industrial process (e.g. applying to the item force of a magnitude which is linearly correlated to the performance assessment assigned to it, cutting another item in a pattern selected based on the performance assessment of the analyzed item, etc.);

A production industrial process (e.g. discarding the analyzed item and/or another item, based on the performance assessment assigned to the analyzed item);

An information technology industrial process (e.g. writing information to a database and/or tangible storage, modifying communication routing channel, encrypting, etc.);

Biological industrial process (e.g. determining which medicine to give to a sick cow, determine which nutritional additives should be added to the food of a group of animals, etc.); and so on.

If the item is a physical item (e.g. a car, a machine), it may be treated based on its performance assessment. For example, in a fleet of cars, cars having the most assessed likelihood of requiring a costly procedure may be discarded, while cars having the lowest likelihood of a major repairs in the coming year may be selected for long distance rides. In another example, if the item is an ill person, an assessment of the likelihood of a relapse in his/her disease may be used in selecting which treatment should be given to such a patient.

The actions executed based on the performance assessment assigned to an item may not pertain to the item itself. For example, sawing parameters of a sawmill may be modified based on an assessing of the ratio of faulty lumber based on the attributes of the forest from which the trees are cut.

As aforementioned, method 600 may be just a variation of method 500, illustrated and discussed with relation to FIG. 3. Using the terms of method 500, optionally, each of the items is associated with item-associated Internet content; wherein for each of the items the quantity of occurrences corresponds to a quantity of item-associated redirections of Internet users to the item-associated Internet content associated with the item, and the quantity of successful occurrences of the item corresponds to a quantity of redirections which yielded reception of an indication of acceptance from the user.

Using the terms of method 500, optionally, the items are keywords, and: (i) the storing includes storing in the storage apparatus for each keyword of the keywords of the set information in which: (a) the quantity of occurrences of the keyword in the sample is indicative of a number of redirections of users which resulted from queries that included the keyword within a sampled time frame; (b) the quantity of successful occurrences of the keyword in the sample is indicative of a number of conversions resulting from the redirections; (ii) the determining includes determining, with respect to each class of the plurality of classes, a conversion-rate estimation, based on quantities of redirections of keywords of a respective subset of keywords of said class; and (iii) the assigning includes assigning to an analyzed keyword a conversion-rate assessment which is based on a conversion-rate estimation of a class out of the classes that is a result of application of the classification scheme to attributes of the analyzed keywords, thereby enabling a selective application of an industrial process, wherein the selective application is responsive to the performance assessment.

It is noted that the displaying of ads in electronic advertising is not necessarily a result of a search engine search query by the user. A possible generalization of ways in which method 500 may be implemented in electronic advertising is that each occurrence is an impression, i.e. a display of an advertisement to a user. The impression (i.e. the displaying of the ad) may result from keyword searching by the user, but may also be a result of a wide variety of other triggers. For example, the impression may result from:

Social media advertising (e.g. basing the decision of the impression on demographics of a user to which the ad is displayed, wherein the trigger may be any usage the user made of a social media website);

Electronic newsletter (e.g. e-mail) sent to registered users (or other users listed in a mailing-list), e.g. based on a decision of a marketer; etc.

In cases in which occurrences are indeed impressions, each successful occurrence may be a click on the advertisement by a user, a redirection of a user which is triggered by a selection of the advertisement by the user (e.g. by clicking, hovering, etc.).

It is noted that in implementations in which the occurrences are impressions, the items may be entities which resulted in display of an advertisement, such as keywords, social media demographics (or other parameters pertaining to the user or to other social media parameters), and so on. In other implementations, the items may also be the advertisement or advertised products.

However, the clicks (or other comparable events, e.g. as discussed above) may serve not only as successful occurrences. Optionally, each occurrence is a click (or another comparable event, e.g. as discussed above), and each successful occurrence is a conversion.

When the occurrences are responses of users to one or more advertisement (e.g. clicking on an advertisement, but also responding to phone-call advertising), each of the items may correspond to a targeted group of people. Especially, if the advertising is social-media adverting (advertisement presented to the user when the latter is using a social networking service/website, such as Facebook™, Google+™, etc), each of the items may correspond to a group of users of the social networking service which are targeted, based on common attributes. Such common attributes may pertain to demographics of such users (e.g. location, age, occupation, language, income) and also to other parameters (e.g. amount of usage of the social networking service, the types of such uses, and so on).

It should be noted that if the aim is devising a refined targeting scheme, a relatively small group of users need to be addressed (e.g. implementing a refined age-based classification, a refined location-based classification, a refined usage-based classification, and so forth). As such groups get smaller, the number of users in each groups decreases, and accordingly also the number of responses to advertising (impressions, clicks, conversions, etc.). Therefore, for at least some of the groups, the available performance data obtained may be limited or otherwise scarce. However, implementation of method 500 may enable assessing the consumer behavior of such groups of people, even though the raw data on such an analysis is scarce.

Reverting now to FIG. 1B which illustrates an operation of the system of FIG. 1A, according to an embodiment of the invention. It is noted that the operation illustrated in FIG. 1B may be implemented by execution of one or more of the variations of method 500 (and of method 800, discussed below).

In the example illustrated in FIG. 1B, each of the items is a car 110. The set of items in this example is a group of cars (denoted 100). For example, the group of cars may include all of the cars in a fleet of a car rental company. The information pertaining to the cars 110 may be generated by system 200, or received from an external system or entity (not illustrated) via interface 205, as illustrated.

The information regarding the cars, which is stored in storage apparatus 210, is indicative for each of the cars 110 at least of: (a) a quantity of identified-occurrences (e.g. occurrences of a given type) of that car 110 in a sample (e.g. over a period of a year); (b) a quantity of successful occurrences of the car 110 in the sample; and (c) at least one attribute of that car 110 with regard to at least one variable out of a set of variables. Several optional variables are offered in the example of table 2A, but it is clear that other parameters and variables may also be obtained and utilized.

The classification scheme may be used for classifying cars into classes which are indicative of an expected number of times (possibly a fractional number) in which a cylinder head of a car is expected to be replaced within the next two years. The number of occurrences may be used for the number of times each of the cars 110 had to be sent to the central garage, or to the number of times in which that car traveled 10,000 kilometers.

Once classification scheme determination module 230 generated such a classification scheme (e.g. according to the techniques discussed above), class management module 240 may determine, with respect to each class of the plurality of classes, defined in the classification scheme, an outcome estimation, which is indicative of car performance. Continuing the example, the outcome estimation determined for each of the plurality of classes may be indicative of a likelihood (or expected number of times) in which a cylinder head of a car is expected to be replaced within the next two years.

Based on this data, performance analysis module 250 may analyze information of one or more cars 110 of a second group 100', to assess an expectancy of performance of each of those cars 110. The second group 100' may include some or all of the cars of group 100 (but necessarily so), and possibly additional cars as well.

Performance analysis module 250 is configured to compute for an analyzed car 110 a performance assessment which is based on the outcome estimation of a classification which is based on the attributes of that analyzed car 110 (and on the classification scheme). For example, performance analysis module 250 may apply the classification scheme determined by classification scheme determination module 230 (or another classification scheme, derived for this one), to classify the cars 110 of group 100' into multiple classes (in the example there are two classes—class 120' and class 120").

Each of the classes 120' and 120" is associated with an outcome estimation determined for it by class management module 240 (e.g. 1% and 0.1%, respectively). Based on outcome estimation and possibly also on the parameter of each of the analyzed cars 110 (i.e. their attributes), performance analysis module 250 determines for each of the analyzed cars 110 a respective performance assessment.

Process management module 260 in the illustrated example is configured to manage an industrial process in which cars 110 to which high expectancy of a significant failure is computed (by performance analysis module 250) are sent for a pre-emptive mechanical treatment in a garage (denoted 190). As can be seen, even though different classes 120 are associated with different outcome estimations, a differentiation of performance assessments computed for cars 110 of different classes do not necessarily correspond directly to the classification.

In this example, performance assessments which are lower than a given threshold (below which cars are sent to the garage) is computed for cars 110 of the two classes 120 (such cars 110 are highlighted in the diagram). This may be a result of the different parameters of each of the cars, and especially it may be a result of information pertaining to previous performance data. For example cylinder head on an old car 110 was already replaced thrice (which is very uncommon), even though such a car 110 may be classified to a class with a lower outcome estimation (e.g. class 120" in the illustrated example).

It will be clear that apart from the selective application of the industrial process which is enabled in the illustrated example (the selective application being responsive to the performance assessment), other industrial processes may also be applied to such cars 110 (or other items).

Figure 5A:
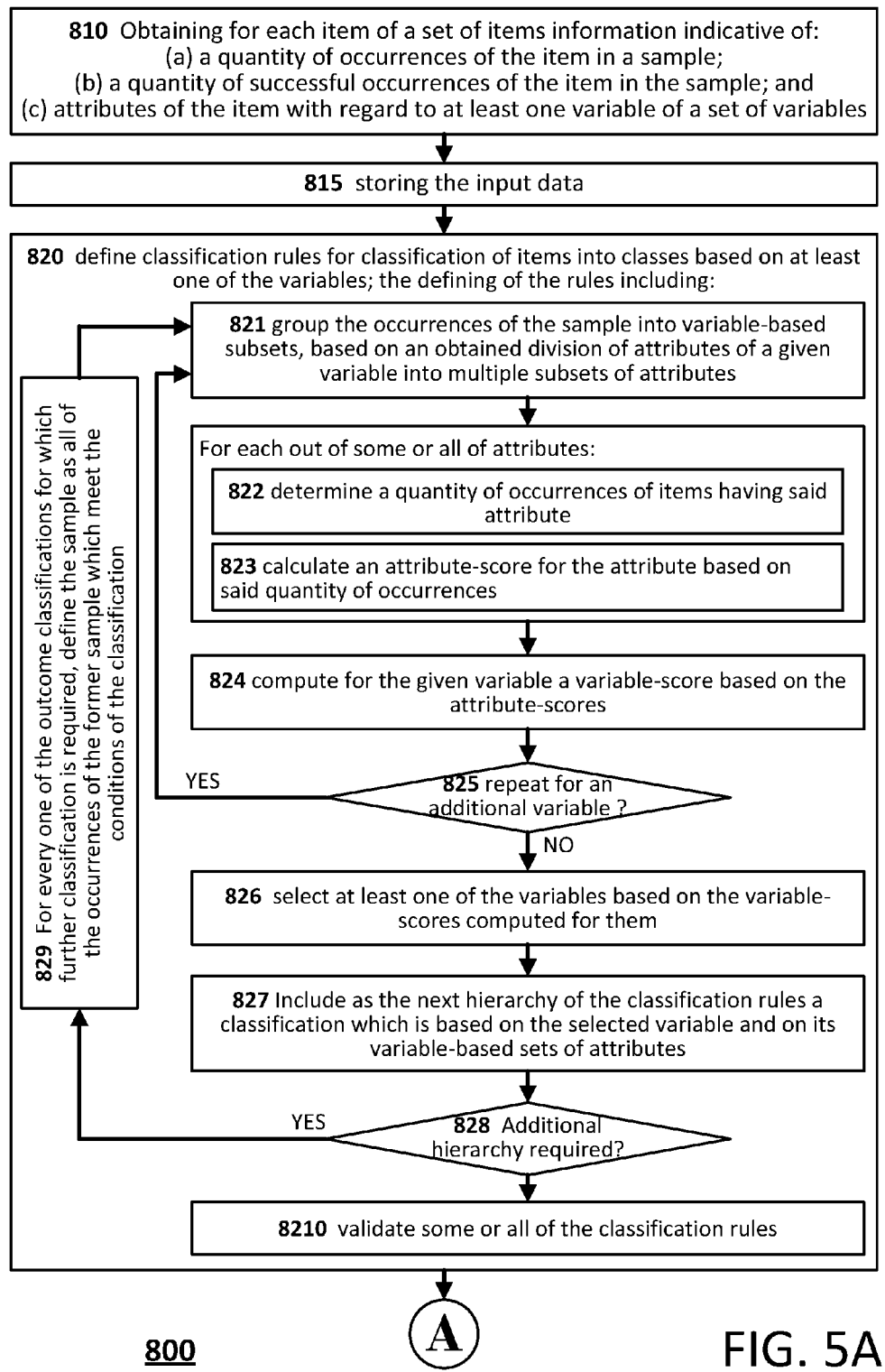
FIGS. 5A and 5B illustrate a computerized classification method, according to an embodiment of the invention.
Figure 5B:
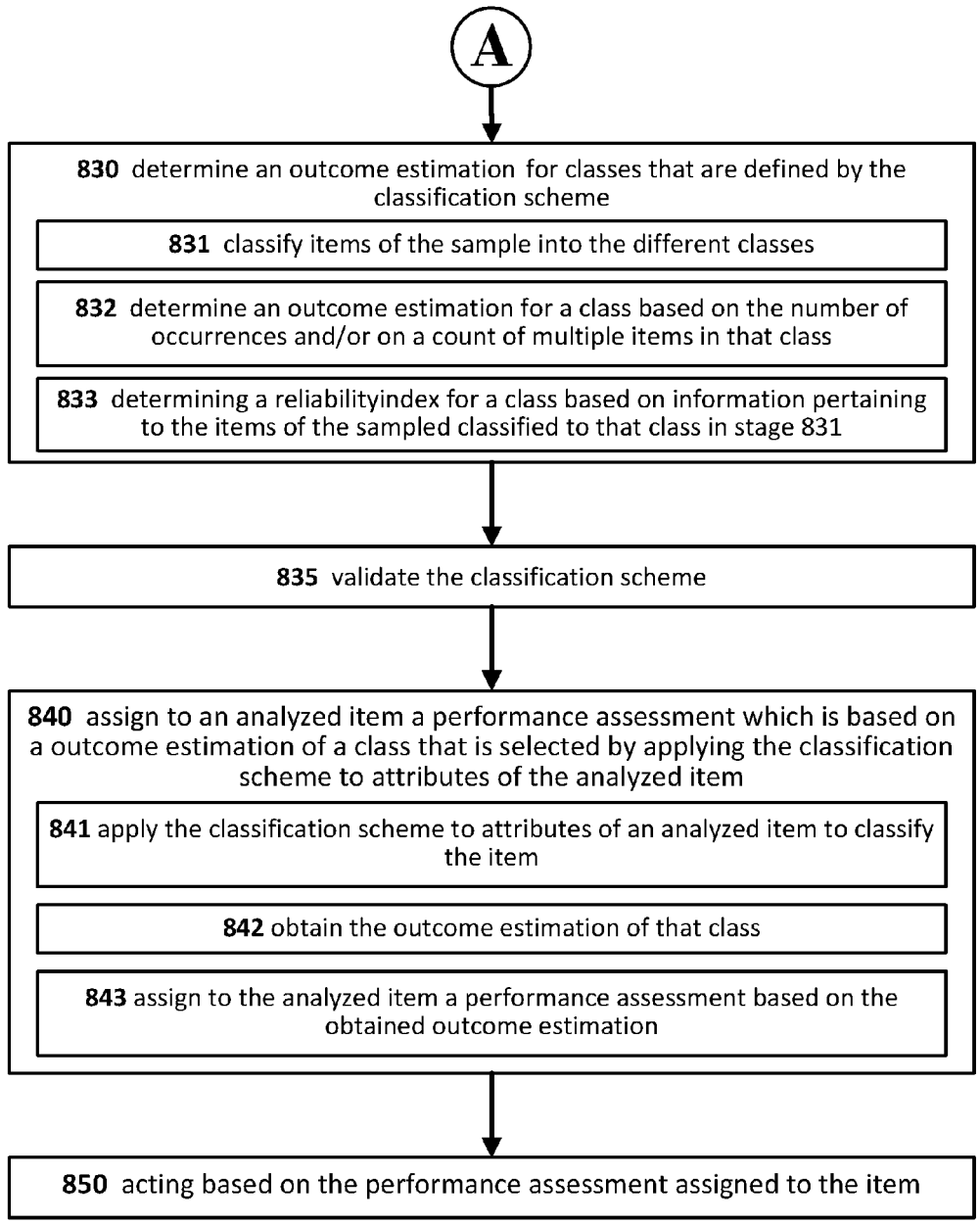

FIGS. 5A and 5B illustrate computerized classification method 800, according to an embodiment of the invention. Stage 810 of method 800 corresponds to stage 510 of method 500, stage 820 to stage 520, stage 830 to stage 530, stage 840 to stage 540, and stage 850 to stage 550. The discussion which pertains to one of stages 510, 520, 530, and 530 of method 500 is considered to be disclosed as a possible implementation (unless inapplicable) of the corresponding stage of method 800, and vice versa, even if not explicitly elaborated.

Referring to the examples set forth in the previous drawings, method 800 may be executed by a system such as system 200. Embodiments, variations and possible implementations discussed with relation to method 800 may be applied to system 200 mutatis mutandis even if not explicitly elaborated, and vice versa.

Referring now to stage 820, which corresponds to stage 520 of method 500 and which includes defining a classification scheme for classification of items into classes based on at least one of the variables.

Stage 820 includes computations which are carried out for different attributes of each one out of a plurality of variables (some or all of the variables of the set). As with methods 500 and 600, the attributes may be divided into multiple subsets, wherein in such cases the required modifications are applied to method 800.

Therefore, stage 820 may include optional stage 821 of obtaining a division of attributes of a given variable into multiple subsets of attributes. As is discussed below, stage 821 is repeated for several variables. The division may be obtained from an external entity (e.g. they may be defined by a human expert), and may also be determined as part of the method. For example, method 800 may include trying out several divisions, and selecting a division which yields better results. In another example, method 800 may include determining the division based on an analysis of data of the sample. If stage 821 is carried out, each of the subsets may be considered as an attribute of its own in the following stages.

TABLE 4

|  | Length | 1st Letter = vowel? | Number of Clicks | Number of Conversions |
| --- | --- | --- | --- | --- |
| Keyword 1 | 5 | Y | 2 | 0 |
| Keyword 2 | 52 | Y | 8 | 1 |
| Keyword 3 | 63 | Y | 6 | 1 |
| Keyword 4 | 45 | Y | 0 | 0 |
| Keyword 5 | 58 | N | 2 | 0 |
| Keyword 6 | 61 | N | 4 | 0 |
| Keyword 7 | 98 | N | 98 | 3 |
| Keyword 8 | 94 | Y | 5 | 0 |
| Keyword 9 | 101 | Y | 25 | 1 |
| Keyword 10 | 102 | Y | 4 | 2 |

For example, the attributes of the variable "Length" which pertains to keywords in the example of table 4 may be divided as exemplified below. In another example, the attributes of another variable may be divided into three groups, so that the items of the sample would be divided into three groups of the same size based on that attribution.

Optional stage 821 may also include grouping the occurrences of the sample into variable-based subsets, each of which includes all of the occurrences of the sample whose attribute is included within one of the subsets of attributes. For example, the distribution of the variable Length may be to the following subsets—

Subset LENGTH1={1 ... 39};
Subset LENGTH2={40 ... 69};
Subset LENGTH3={>70}

TABLE 5

| Subset | Item | LENGTH | Number of Clicks | Number of Conversions |
| --- | --- | --- | --- | --- |
| LENGTH1 | Keyword 1 | 5 | 2 | 0 |
| LENGTH2 | Keyword 2 | 52 | 8 | 1 |
|  | Keyword 3 | 63 | 6 | 1 |
|  | Keyword 4 | 45 | 0 | 0 |
|  | Keyword 5 | 58 | 2 | 0 |
|  | Keyword 6 | 61 | 4 | 0 |
| LENGTH3 | Keyword 7 | 98 | 98 | 3 |
|  | Keyword 8 | 94 | 5 | 0 |
|  | Keyword 9 | 101 | 25 | 1 |
|  | Keyword 10 | 102 | 4 | 2 |

Table 5 illustrates the keywords of the sample of table 4, wherein each keyword is grouped into one of the subsets (in the column entitled "subset"). The variable "Length subset" may be used in the following stages, having the attributes "LENGTH1", "LENGTH2", and "LENGTH3".

Stage 822 of method 800 includes computing for one of the attributes a quantity of occurrences of items having said attribute. Stage 822 is repeated for some or all of the attributes of the given variable. It is noted that more than one quantity of occurrences may be calculated for each attribute, and that quantities of occurrences may be computed differently in different embodiments of the invention.

For example, stage 821 may include calculating for the attribute a quantity of successful occurrences of items having said attribute. Furthermore, stage 821 may include calculating for the attribute a quantity of all of the successful occurrences of items in the sample (or in a subset thereof) having said attribute. For example, while in some implementations the quantity of successful occurrences may indicate the overall number of successful occurrences of items in the sample having said attribute, in another implementation the quantity of successful occurrences may only be calculated for the first 100,000 items (or first 100,000 occurrences) because of memory limitations.

For example, stage 821 may include calculating for the attribute a quantity of unsuccessful occurrences of items having said attribute (for each item, the quantity of unsuccessful occurrences may be calculated as the difference between the quantity of occurrences to the quantity of successful occurrences). Furthermore, stage 821 may include calculating for the attribute a quantity of all of the unsuccessful occurrences of items in the sample (or in a subset thereof) having said attribute. For example, while in some implementations the quantity of unsuccessful occurrences may indicate the overall number of unsuccessful occurrences of items in the sample having said attribute, in another implementation the quantity of unsuccessful occurrences may only be calculated for the first 100,000 items (or first 100,000 occurrences) because of memory limitations.

For example, stage 821 may include calculating for the attribute a quantity of occurrences of items having said attribute. Furthermore, stage 821 may include calculating for the attribute a quantity of all of the occurrences of items in the sample (or in a subset thereof) having said attribute. For example, while in some implementations the quantity of occurrences may indicate the overall number of occurrences of items in the sample having said attribute, in another implementation the quantity of occurrences may only be calculated for the first 100,000 items (or first 100,000 occurrences) because of memory limitations.

Without limiting the scope of the invention, in the following discussion, the method is primarily exemplified referring to implementations in which such quantities of occurrences pertain to summing of occurrences from the entire sample (or from subsets of the sample which are defined only on an attribute based division, e.g. as exemplified with respect to stage 828).

Reverting to the success count, the success count may be a count of the quantity of successful occurrences of all the items in the variable based subset (i.e. all of the items in the sample whose attribute belongs to the subset of attributes).

With respect to the example of table 5, the quantity of successful occurrences of each item (keyword) is indicated in the column headed "number of conversions". Therefore, the success count of attribute LENGTH1 is 0, that of attribute LENGTH2 is 2, and that of attribute LENGTH3 is 6.

As aforementioned, stage 822 may also include computing for the attribute (or variable-based subset) an occurrences count of all of the occurrences in the sample having said attribute. In such an implementation the occurrences count may be a count of the quantity of occurrences of all the items of the sample having said attribute. With respect to the example of table 5, the quantity of occurrences of each item (keyword) is indicated in the column headed "number of clicks". Therefore, the occurrences count of attribute LENGTH1 is 2, that of attribute LENGTH2 is 20, and that of attribute LENGTH3 is 132.

As aforementioned, stage 822 may also include computing for the attribute a fail count of all of the occurrences in the sample which are not successful. The fail count in such an implementation is equal to the difference between the occurrences count and the success count. With respect to the example of table 5, the fail count of attribute LENGTH1 is 2, that of attribute LENGTH2 is 18, and that of attribute LENGTH3 is 126.

The defining of the classification scheme may be facilitated by stage 823 of calculating a score for the attribute, based on the success count, the fail count, the occurrences count, or any combination thereof. Possibly, the calculating of the attribute-score in stage 823 may be based on other parameters as well.

The calculating of the attribute-score in stage 823 may include calculating an information entropy value for the attribute. For example, the calculating of entropy in stage 823 (if implemented) may include determining the attribute-value E(s) for the attribute, so that $$E(s) = -\sum_{j=1}^{n} f_s(j) \log_2 f_s(j),$$

wherein the different values j are the possible outcomes of each occurrence, and $f_S(j)$ is the proportion of the value j in the set S.

If, as in the example above, only two general types of outcome are considered (successful occurrence and unsuccessful occurrence), the value E(s) may be determined as $E(s)=-f_s(\text{success}) \cdot \log_2 f_s(\text{success}) - f_s(\text{fail}) \cdot \log_2 f_s(\text{fail})$, which is equal to:

$$E(s) = -\frac{N_{success}}{N_{occurrences}} \cdot \log_2\left(\frac{N_{success}}{N_{occurrences}}\right) - \frac{N_{fail}}{N_{occurrences}} \cdot \log_2\left(\frac{N_{fail}}{N_{occurrences}}\right)$$

It will be obvious that some variations on these formulae may be implemented if they are considered, for example, to simplify the calculations. For example, logarithms of different bases may be used; the negative computation may be replaced with a computation of positive numbers, and so on. The attribute-score calculated for one or more of the attributes is not necessarily an entropy, and may depend on parameters other than the aforementioned counts (in addition to or instead of those one or more counts). Also, if more than two types of outcome are considered, the entropy (or other attribute-score) may be responsive to information pertaining to more than two types of outcomes.

Once scores are calculated for the two or more (possibly all) of the attributes which are based on the division of the attributes of the given variable, a variable-score may be computed for the given variable, based on one or more of the attribute-scores.

Optional stage 824 of method 800 includes computing for the given variable a variable-score, based on the scores of the plurality of attributes. This variable-score may be later used in the defining of the classification scheme (e.g. by utilizing a comparison between the variable-scores of at least two of the multiple variables). The computing of the variable score in stage 824 may be further based on additional parameters, such as the relative sizes of the different variable-based sets.

For example, the variable-score may be computed by:

$$VS(V) = \sum_{i=1}^{m} f_S(A_i) \cdot E(S_{Ai})$$

where VS(V) is the variable-score of the given variable V over the sample S. E(S) is the information entropy of the entire sample S. m is the number of the attributes of V. $f_S(A_i)$ is the proportion of the items which belong to attribute i, and $E(S_{Ai})$ is the attribute-score of the i'th attribute (e.g. its entropy).

It will be obvious that some variations on this formula may be implemented if it is considered, for example, to simplify the calculations. The variable-score computed for the given variable may be some variation on the Kullback-Leibler divergence, information divergence, information gain, relative entropy, etc. as those are known in the art, but this is not necessarily so. The computing of the variable-score VS(V) for the given variable may depend on parameters other than those discussed with respect to the example formula.

It should be noted that a variable-score for a variable is not necessarily computed based on attribute-scores as discussed above, but may otherwise be computed. The computing of the variable score (whether based on attribute-scores of several attributes or not) may be repeated for several variables (denoted stage 825 in FIG. 5A).

Method 800 may continue with stage 826 of selecting a variable out of the variables, based on the variable-scores assigned to them. For example, the variable for which the highest (or alternatively the lowest) variable-score was computed may be selected.

The variable selected may be used for defining a classification hierarchy based on that variable. For example, the classification scheme exemplified in FIG. 4A may be defined in a process which includes selecting the match type at a first instance of stage 826. The classification scheme may include classifying an item into a class (which may include subclasses to which items may be classified) based on its attributes with respect to the selected variable (e.g. match type). Although not necessarily so, the classification scheme may utilize the same attributes as those used for the determining of the attribute scores and/or the variable-score.

For example, the attributes used in the computing of the attribute scores of the attributes defined with respect to table 5 (attribute LENGTH1 iff LENGTH={1 . . . 39}; attribute LENGTH2 iff LENGTH={40 . . . 69}; and attribute LENGTH iff LENGTH={>70}) may be those by which the classifying is executed according to the classification scheme in the example of FIG. 4A.

As can be seen in FIG. 4A, for two of the attributes (LENGTH1 and LENGTH2) the classification scheme includes another classification hierarchy. If an additional hierarchy is indeed required (decision point is denoted 828), then for every one of the outcome classifications for which further classification is required, the sample for the next-level computations is defined as all of the occurrences of the former sample which meet the conditions of the classification. This is denoted 829.

At each level, once a variable has been selected, method 800 may include stage 827 of including as the next hierarchy of the classification scheme a classification which is based on the selected variable and on its variable-based sets of attributes.

If stage 822 is repeated for computing for each out of a plurality of the attributes a success count of all of the successful occurrences in the sample having said attribute; method 800—and especially the defining of the classification scheme in stage 820—may further include:

computing for each of the plurality of attributes of each of the multiple variables a fail count of all of the occurrences in the sample whose attribute belongs to the attribute and which are not successful occurrences;

computing for each of the plurality of attributes of each of the multiple variables an attribute-score, based on the success count, on the fail count, and on a number of all occurrences in the sample having that attribute; and possibly also computing for each one of the multiple variables a variable-score based on the attribute-scores of the plurality of attributes of that variable.

In such a case, the defining of the classification scheme may be based on the variable-scores of at least two of the multiple variables.

Stage 820 may further include stage 8210 that includes validating parts or all of the classification scheme. The validating may include classifying some items (whether of the trial set or not), and applying some validation criteria to see whether the generated classes of items are sufficiently useful. The validation may also be applied at a later stage of method 800.

It should be noted that while not necessarily so, the classification scheme (or at least the way in which it is executed) may include guides as to what to do if a analyzed item does not have information regarding some of the variables, or other similar problems. For example, referring to the example of FIG. 4A, an item having a match type "Exact", but whose length is not known (for some reason), may be classified to a class which includes all of the items having the match type "Exact" (this class includes classes D, E, and F—as well as other items whose lengths are not known).

It should be noted that since the classification scheme is based on attributes, the same classification scheme may be applied to occurrences as well as to items. That is, in a sense, occurrences may be classified independently of the items.

Stage 830 of method 800 includes determining an outcome-estimation for classes that are defined by the classification scheme. As aforementioned with respect to method 500, method 800 may also include determining additional parameters for classes that are defined by the classification scheme, based on information of items of the samples which are classified to the respective classes. While not necessarily so, the calculating of the outcome estimation and/or the additional parameters determined for a class is irrespective of data pertaining to items of the sample which are not included in that class.

Stage 830 may start with stage 831 of classifying items of the sample into the different classes, based on the defined classification scheme. It is noted that if the classification scheme is subject to validation, the classification scheme used for the determining of stage 830 may not be the final one defined in the method, as some refinements or corrections may be applied to it. It is noted that stage 831 may include classifying into the classes either the items and/or their occurrences.

It is noted that stage 831 may include classifying all of the items of the sample, or only part of them. For example, in some implementations, items having zero occurrences are not necessarily classified.

Stage 831 may be followed by stage 832 that includes determining an outcome estimation for a class based on information pertaining to the items of the sampled classified to that class in stage 831, such as the number of occurrences and/or on a count of multiple items in that class.

Method 800 may also include determining of one or more additional parameters for each class. For example, optional stage 833 includes determining a reliability index for a class based on information pertaining to the items of the sampled classified to that class in stage 831, such as the number of occurrences and/or on a count of multiple items in that class.

The determining of the outcome estimation and the optional additional parameters may be repeated for some or all of the classes. For example, the outcome estimation may be the total number of successful occurrences of the items in the class by the total number of occurrences of the items in the class.

A few other examples of ways in which the outcome estimation may be determined may be based on the examples provided by M. U. Kalwani in an article entitled "*Maximum Likelihood Estimation of Zero-Order Models Given Variable Numbers of Purchases Per Household*" (published in the Journal of Marketing Research, Vol. 17, No. 4 (November, 1980), pp. 547-551). In but one example, the determining of the outcome estimation may be based on equation 6 in that article, by maximizing the following expression:

$$L(n_x^k \mid \mu, \phi, k's) = \sum_{k=1}^{K} \left[ \sum_{x=0}^{k} n_x^k \left\{ \begin{array}{l} \sum_{r=0}^{x-1} \log[\mu(1+\phi) + r\phi] + \\ \sum_{r=0}^{k-x-1} \log[(1-\mu)(1-\phi) + r\phi] - \\ \sum_{r=0}^{k-1} \log(1-\phi+r\phi) \end{array} \right\} \right]$$

In the terms of the present disclosure, the log likelihood function L is based on the parameters $\mu$ and $\phi$ and multiple k's. k indicates the number of occurrences of an item. In the sample, items may have different numbers of occurrences, and it is assumed that the maximal number of occurrences of a single item is K. $n_x^k$ is the number of items with x successful occurrences out of k occurrences of that item.

Since the $n_x^k$'s are known in advance (from the obtained information of the sample), the only parameters by which L may be maximized are $\mu$ and $\phi$. In this example, the outcome estimation of the class (and the possible additional parameters) may be based on the values of those parameters.

For example, the outcome estimation of the class may be equal to $\mu$ (S=$\mu$), and the reliability index may be defined based on $\phi$ (e.g. T=1/(1+$\phi$)). In an example, the final parameters T and S are set for all valid nodes: S is the maximum likelihood value computed in step 1, T is the larger of: (a) the maximum likelihood value computed; and (b) minimum T value for node, which depends on the value of S and a tolerance threshold.

It is noted that the validation of the classification scheme may also follow (or be integrated with) the determining of the outcome estimation (denoted stage 835). For example, classes for which an outcome estimation may not be determined with sufficient reliability may be canceled, and the classification scheme may be modified accordingly.

It should be noted that in the aforementioned article of Kalwani, the parameters are not used for validation of a classification, nor it is used for a Bayesian function for computation of performance assessment (such as conversion rate assessment).

Figure 4B:
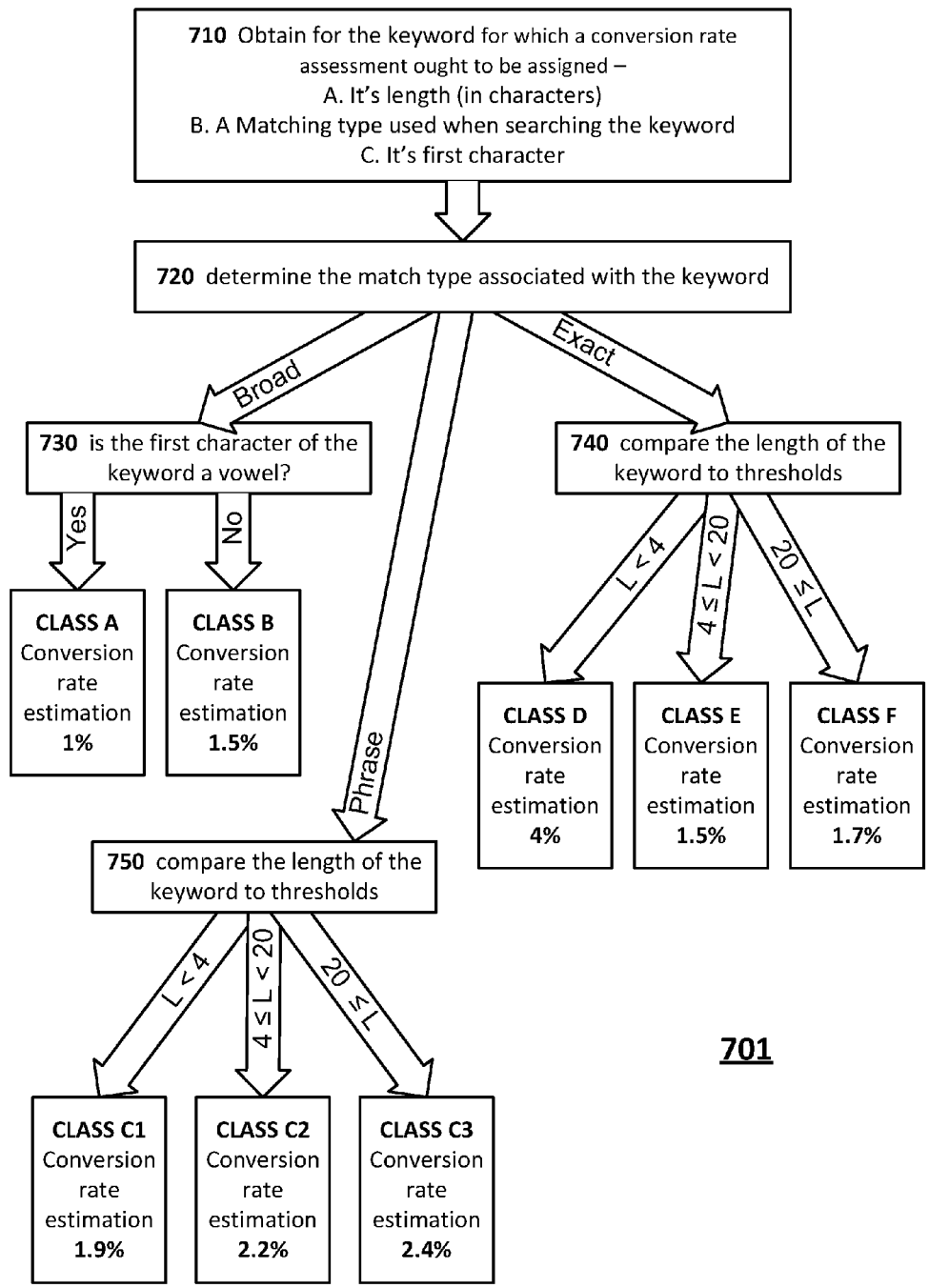

FIG. 4B illustrates preliminary classification scheme 701, which is an example to classification schemes that may be determined in an implementation of method 800, according to an embodiment of the invention.

Preliminary classification scheme 701 is similar to classification scheme 700 of FIG. 4A, but keywords whose Match type is equal to "Phrase" are classified into three classes (C1, C2, and C3) based on their length. If validation of the outcome estimation and/or other parameters of classes C1, C2, and C3 indicates that the results are not sufficiently reliable, those classes may be canceled, and preliminary classification scheme 701 would be amended to resemble classification scheme 700 of FIG. 4A. It should however be noted that in another example, only some of the subclasses of some class will be cancelled (e.g. only class C3), while other classes would be kept.

It is also noted that the above example for validation includes pruning of a tree structure of classes. However, as aforementioned, the classification scheme is not necessarily equivalent to a tree, and in some implementations other techniques of validation may be applied.

An example for validation may include repeating the process of determining an outcome-estimation and possibly also additional parameters (e.g. the aforementioned S and T) for several subclasses of the validated class. For example, that calculation may be repeated for a given number (e.g. 100) of bootstrap samples of the items of a leaf member class (assuming a tree-like classification).

The validation continues with computing statistical parameters (e.g. mean and standard deviation) of the outcome estimation and/or other parameters over all bootstrap samples, as well as the mean estimated performance (e.g. mean estimated conversion rate). Following that, an error of the outcome estimation may be calculated by propagation of errors of the outcome estimation and/or the other parameters (e.g. T and S).

Validity of the validated classes may be determined based on the statistical parameters and/or the error computed. For example, if the error in conversion rate relative to the mean estimated conversion rate is smaller than a given threshold, the class is valid for outcome estimation similarity. Optionally, otherwise the validation is implemented for the parent of the leaf member class.

It is noted that the validation (e.g. the pruning) according to the above example (and in other techniques as well) may be significant. According to the disclosed example, the classification scheme is defined (e.g. the building of the classification tree) in response to the quantities of occurrences (and/or successful occurrences) having a given attribute. That is, in such a classification scheme defining process, the occurrences of multiple items are aggregated, based on common attributes.

In the example of the validation process, however, the results are validated based on the quantity of items, without aggregating the quantities of occurrences of those items. Since the type of data on which the validation is based may be significantly different than the type of data by which the classification scheme is defined (e.g. as in the example above), the validation may be significant. For example, the pruning may include pruning of a significant amount of nodes from the classification tree. A pruning of tens of percents of the nodes is not uncommon.

Referring to the validation of the classification scheme based on the quantity of items having a given attribute (as opposed to quantity of occurrences of such items), it is noted that if a thousand occurrences of a given class are of a single item, the significance of that class may be lower than a class having also a thousand occurrences, which are derived from a hundred items. The reliability of a classification (in such an implementation) lessens as the number of items in each such proposed classification is lower.

Stage 840 includes assigning to a analyzed item a performance assessment which is based on a outcome estimation of a class that is selected by applying at least one of the classification schemes to attributes of the analyzed item.

Stage 840 may include stages 841, 842, and 843. Stage 841 includes applying at least one of the classification schemes to attributes of a analyzed item to classify the item (i.e. to select a class for it); stage 842 includes obtaining the outcome estimation of that class, and stage 843 includes assigning to the analyzed item a performance assessment based on the obtained outcome estimation. It should be noted that after stage 840 is concluded, a result of applying the classification scheme used in stage 840 may be directly obtaining the outcome estimation (and potentially additional parameters) without first classifying the item. That is, for attributes $a_1 \ldots a_n$, there may be a function (or an equivalent thereof) such as (outcome estimation$|a_1 \ldots a_n)=f(a_1 \ldots a_n)$, and not necessarily two functions (or equivalents thereof such as (class$|a_1 \ldots a_n)=g(a_1 \ldots a_n)$ and (outcome estimation|class)=h(class).

Regarding stage 843, it is noted that the performance assessment assigned to the analyzed item may be derived from the outcome estimation in many ways. For example, it may be equal thereto.

The performance assessment may be determined further based on additional parameters assigned to the class (e.g. the reliability index), and/or on additional parameters pertaining to the item (e.g. the quantity of its occurrences in the sample and/or the quantity of its successful occurrences therein).

For example, the performance assessment assigned to the analyzed item may be equal to a function whose parameters are the outcome estimation and the reliability index of the class to which the item is classified, and the quantities of occurrences and successful occurrences in the sample. For example, referring to the example in which the parameters S and T are determined for each class, the performance assessment may be determined to be equal to a ratio between a sum of the quantity of successful occurrences of the item in the sample and a multiplication of S and T by a sum of the quantity of occurrences of the item in the sample and T.

The performance assessment may be used to evaluate an outcome of occurrences of the item. Referring to the example in which the items are keywords used in electronic commerce and advertising, the performance assessment may be an assessment of the conversion rate of keywords.

The assigning of the performance assessment may be implemented for items which were part of the sample, but may also be implemented for items which were not part of the original sample.

Regarding the former, it is noted that a performance assessment may be assigned according to the disclosed methods to items which had no occurrences in the sample, and to items having a very small number of occurrences.

Consider a keyword which had one successful occurrence in the sample, out of a single occurrence. While the crude conversion rate of that keyword (the conversion rate as reflected only from its occurrences in the sample) is 100%, it would clearly be erroneous to assign such a conversion rate to that keyword. According to the disclosed method, the conversion rate assessment (performance assessment in the given implementation) assigned to that keyword would be less than that, based on the conversion rate estimation assigned to the class to which the discussed keyword is classified.

While not necessarily so, the deriving of the performance assessment for an item from the respective outcome estimation of the class may be implemented so that items with less occurrences in the sample would receive a performance assessment which depends more significantly on the outcome estimation of the class when compared to items with more occurrences (in which the performance assessment would be more inclined toward their crude performance assessment as reflected in the sample).

Referring to the determining of the classification scheme, it is noted that it is based on information from which the performance results of a given item may be derived (the so-called crude performance assessment). However, the outcome estimation obtained for that very item based on its attributes (in stage 840) may be very different from that crude performance assessment (e.g. different by a ratio higher than 1:2). Furthermore, it is noted that an outcome estimation associated with another class may be between the crude performance assessment of an item and the performance assessment assigned to it due to the outcome estimation of the class to which it is classed.

Addressing methods 500, 600 and 800, as well as system 200, it is noted that the proposed methods and systems may be based on Bayesian statistics, in which the evidence about the true state of the world is expressed in terms of Bayesian probabilities.

In at least some of the embodiments of the disclosed methods and systems (as disclosed above), the classification (and the classification scheme) is based on attributes which are not dependent on the performance (e.g. conversion rate) of the different items of the training set.

In opposition to classic decision trees, the disclosed methods and systems may be used to assigning to items performance estimates which are different than those which are reflected in the sample.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Reverting to the discussion of system 200 (illustrated in FIG. 1A), it is noted that as aforementioned, embodiments, variations and possible implementations discussed with relation to any of methods 500, 600, and 800 may be applied to system 200 mutatis mutandis even if not explicitly elaborated. Some such variations are provided below as examples, but it is noted that implementations of system 200 are not limited to those discussed below.

Optionally, the defining process implemented by classification scheme determination module 230 may include assigning a score to each out of a plurality of attributes of a plurality of variables of the set, based on a quantity of occurrences of items having said attribute. Optionally, the defining of the classification scheme is irrespective of a success rate of any item of the set of items.

As discussed with respect to the aforementioned methods, system 200 may be effectively utilized in many situations, and among those in situations in which occurrences of a relatively large part of the items are scarce. Optionally, at least half of the items of the sample whose quantity of occurrences is larger than zero and whose information is used in the defining of the classification scheme appear in the sample less than ten times.

As discussed with respect to the aforementioned methods, system 200 may be effectively utilized in many situations, and among those in situations in which the items are related to electronic advertising. For example, method 200 may be implemented in electronic advertising in that each occurrence is an impression, i.e. a display of an advertisement to a user. The impression (i.e. the displaying of the ad) may result from:

Keyword searching by the user in a search engine;

Social media advertising (e.g. basing the decision of the impression on demographics of a user to which the ad is displayed, wherein the trigger may be any usage the user made to a social media website);

Electronic newsletter (e.g. e-mail) sent to registered user (or other users listed in a mailing-list), e.g. based on a decision of a marketer; etc.

In cases in which occurrences are indeed impressions, each successful occurrence may be a click on the advertisement by a user, a redirection of a user which is triggered by a selection of the advertisement by the user (e.g. by clicking, hovering, etc.). It is noted that in implementations in which the occurrences are impressions, the items may be entities which resulted in the display of an advertisement, such as keywords, social media demographics (or other parameters pertaining to the user or to other social media parameters), and so on. In other implementations, the items may also be the advertisement or advertised products. As with the aforementioned methods, the clicks (or other comparable events, e.g. as discussed above) may serve not only as successful occurrences. Optionally, each occurrence is a click (or another comparable event, e.g. as discussed above), and each successful occurrence is a conversion.

Optionally, the storage apparatus is configured to store for each keyword of the keywords of the set information in which: (a) the quantity of occurrences of the keyword in the sample is indicative of a number of redirections of users which resulted from queries that included the keyword within a sampled time frame; (b) the quantity of successful occurrences of the keyword in the sample is indicative of a number of conversions resulting from the redirections; the class management module is configured to determining, with respect to each class of the plurality of classes, a conversion-rate estimation, based on quantities of redirections of keywords of a respective subset of keywords of said class. The defining process in such an implementation of the invention may include assigning to an analyzed keyword a conversion-rate assessment which is based on a conversion-rate estimation of a class out of the classes that is a result of application of the classification scheme to attributes of the analyzed keywords, thereby enabling a selective application of an industrial process, wherein the selective application is responsive to the performance assessment.

Optionally, the performance analysis module may be configured to update an entry that is associated with the analyzed keyword in a bidding database based on the conversion-rate assessment, for facilitating cost reduction in a bidding process that depends on the analyzed keyword.

It is noted that the example provided in the previous two paragraphs may be extended to items that are entities which resulted in the display of an advertisement, other than keywords. Those may include for example social media demographics and other parameters pertaining to the user or to other social media parameters, and so on. For example, each of the items may correspond to a targeted group of people. Optionally, each occurrence is an impression, and each successful occurrence is a click.

In implementations in which the defining process implemented by classification scheme determination module 230 includes assigning a score to each out of the plurality of attributes of a plurality of variables, classification scheme determination module 230 may be configured to execute one or more of the following processes:

Assigning the score to each out of the plurality of attributes based on a quantity of successful occurrences of items having said attribute.

Assigning the score to each of the plurality of attributes based on a quantity of all the successful occurrences of items having said attribute.

Assigning the score to each out of the plurality of attributes based on a quantity of unsuccessful occurrences of items having said attribute.

Computing the score to each of the plurality of attributes based on: (a) a quantity of all of the successful occurrences which are associated with said attribute in a subset of the sample, (b) a quantity of all of the occurrences in the subset which are associated with said attribute and which are not successful occurrences; and (c) a quantity of all of the occurrences in the subset which are associated with said attribute.

Computing for each one of the plurality of the variables a variable-score based on the scores assigned to at least two of the attributes of said variable, wherein the defining of the classification scheme is based on the variable-scores of at least two of the plurality of variables.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A system for classification of advertisements, the system comprising:

a storage apparatus, configured to store information pertaining to items out of a set of items, thereby to yield stored items, the stored information for each given stored item being indicative of:

(a) a total quantity of occurrences of the given stored item in a sample;

(b) a quantity of successful occurrences of the given stored item in the sample; and (c) one or more attributes of at least one variable characterizing the given stored item, wherein an occurrence of an item is regarded successful if it fulfills a predefined condition associated with a predefined outcome of the occurrence; and a processor, comprising:

a classification scheme determination module configured to define a classification scheme comprising a plurality of classes for classifying the stored items into classes, defining the classification scheme includes processing the stored information to assign a score to the at least one variable, the assigned score corresponding to a plurality of values corresponding to different attributes out of a plurality of attributes of the at least one variable, each value indicative of a number of successful occurrences of the stored items characterized by the same attribute;

a class management module configured to obtain for each class, out of the plurality of classes, a respective subset of the stored items by applying the defined classification scheme to the stored items, and to determine, with respect to each given class out of the plurality of classes, an outcome estimation value of the given class, the outcome estimation value indicative of the given class performance and based on a value indicative of successful occurrences of the stored items out of the subset of the stored items classified to the given class; and a performance analysis module configured to classify an analyzing item which does not belong to the set of items by applying the defined classification scheme to attributes characterizing the analyzing item, and to assign to the analyzing item a performance assessment value being a function of the outcome estimation value determined for the given class to which the analyzing item is classified, thereby enabling a selective application of an industrial process, wherein the selective application is responsive to the performance assessment.

2. The system according to claim 1, wherein the defining the classification scheme includes assigning a score to each attribute out of the plurality of attributes of the at least one variable, based on a number of occurrences of stored items characterized by the attribute.

3. The system according to claim 2, wherein the assigning the score further comprises assigning the score to each given attribute out of the plurality of attributes based on a number of successful occurrences of the stored items characterized by the given attribute.

4. The system according to claim 2, wherein the assigning the score further comprises assigning the score to each given attribute out of the plurality of attributes based on a number of unsuccessful occurrences of the stored items characterized by the given attribute.

5. The system according to claim 2, wherein the assigning of the score to each given attribute out of the plurality of attributes comprises computing the score to the given attribute based on: (a) a number of successful occurrences which are associated with the given attribute in a subset of the sample; (b) a number of unsuccessful occurrences which are associated with the given attribute in the subset of the sample; and (c) a total number of occurrences which are associated with the given attribute in the subset of the sample.

6. The system according to claim 1, wherein the items are keywords.

7. The system according to claim 1, wherein each of the items corresponds to a targeted group of people.

8. The system according to claim 1, wherein each occurrence is an impression and each successful occurrence is a click.

9. A computerized method for classification of advertisements, the method comprising:

storing in a non-transitory storage media information pertaining to items of a set of items thereby yielding stored items, the stored information for each given stored item being indicative of:
(a) a total quantity of occurrences of the given stored item in a sample;
(b) a quantity of successful occurrences of the given stored item in the sample; and
(c) one or more attributes of at least one variable characterizing the given stored item, wherein an occurrence of an item is regarded successful if it fulfills a predefined condition associated with a predefined outcome of the occurrence;

defining a classification scheme comprising a plurality of classes and configured for classifying the stored items into classes, wherein the defining the classification scheme comprises processing the stored information to assign a score to the at least one variable, the assigned score corresponding to a plurality of values corresponding to different attributes out of a plurality of attributes of the at least one variable, each value indicative of a number of successful occurrences of the stored items characterized by the same attribute;

applying the defined classification scheme to attributes characterizing the stored items, thereby obtaining for each given class out of the plurality of classes a subset of the stored items in the given class;

determining, with respect to each given class out of the plurality of classes, an outcome estimation value of the given class, the outcome estimation value indicative of the given class performance and based on quantities of successful occurrences of the stored items out of the subset of the stored items classified to the given class;

classifying an analyzing item which does not belong to the set of items by applying the defined classification scheme to attributes characterizing the analyzing item, and assigning to the analyzing item a performance assessment value being a function of the outcome estimation value determined for the given class to which the analyzing item is classified, thereby enabling a selective application of an industrial process, wherein the selective application is responsive to the performance assessment.

10. The computerized method according to claim 9, wherein the defining the classification scheme includes assigning a score to each given attribute out of the plurality of attributes of the at least one variable, based on a number of occurrences of stored items characterized by the given attribute.

11. The computerized method according to claim 10, wherein the assigning comprises assigning the score to each given attribute out of the plurality of attributes based on a number of successful occurrences of the stored items characterized by the given attribute.

12. The computerized method according to claim 10, wherein the assigning the score comprises assigning the score to each given attribute out of the plurality of attributes based on a number of unsuccessful occurrences of the stored items characterized by the given attribute.

13. The computerized method according to claim 10, wherein the assigning of the score to each given attribute out of the plurality of attributes comprises computing the score to the given attribute based on: (a) a number of successful occurrences which are associated with the given attribute in a subset of the sample; (b) a number of unsuccessful occurrences which are associated with the given attribute in the subset of the sample; and (c) a total number of occurrences which are associated with the given attribute in the subset of the sample.

14. The computerized method according to claim 9, wherein the items are keywords.

15. The computerized method according to claim 14, wherein the storing comprises storing in the non-transitory storage media for each given stored keyword out of a set of stored keywords information in which:
(a) the total quantity of occurrences of the given stored keyword in the sample is indicative of a number of redirections of users which resulted from queries that included the given stored keyword within a sampled time frame;
(b) the quantity of successful occurrences of the given stored keyword in the sample is indicative of a number of conversions resulting from the redirections;
wherein the determining the outcome estimation value comprises determining, with respect to each given class of the plurality of classes a conversion-rate estimation, based on quantities of redirections of stored keywords out of a respective subset of stored keywords in the given class;

wherein the assigning the score comprises assigning to an analyzed keyword which does not belong to the set of stored keywords a conversion-rate assessment which is based on a conversion-rate estimation of the given class corresponding to the analyzing item.

16. The computerized method according to claim 15, further comprising updating an entry that is associated with the analyzed keyword in a bidding database based on the conversion-rate assessment, for facilitating cost reduction in a bidding process that depends on the analyzed keyword.

17. The computerized method according to claim 9, wherein each of the items corresponds to a targeted group of people.

18. The computerized method according to claim 9, wherein each occurrence is an impression and each successful occurrence is a click.

19. The computerized method according to claim 9, wherein each occurrence is a click and each successful occurrence is a conversion.

20. A program storage device readable by machine, tangibly embodying a program of instructions executable by the machine to perform a method for classification of advertisements, comprising the steps of:

storing in a non-transitory storage media information pertaining to items of a set of items, thereby yielding stored items, the stored information for each given stored item being indicative of:
(a) a total quantity of occurrences of the given stored item in a sample;
(b) a quantity of successful occurrences of the given stored item in the sample; and
(c) one or more attributes of at least one variable characterizing the given stored item, wherein an occurrence of an item is regarded successful if it fulfills a predefined condition associated with a predefined outcome of the occurrence;

defining a classification scheme comprising a plurality of classes and configured for classifying the stored items into classes;

wherein the defining the classification scheme comprises:
processing the stored information to assign a score to the at least one variable, the assigned score corresponding to a plurality of values corresponding to different attributes out of a plurality of attributes of the at least one variable, each value indicative of a number of successful occurrences of the stored items characterized by the same attribute;

applying the defined classification scheme to the attributes characterizing the stored items, thereby obtaining for each given class out of the plurality of classes a subset of stored items in the given class;

determining, with respect to each given class out of the plurality of classes, an outcome estimation value of the given class, the outcome estimation value indicative of the given class performance and based on quantities of successful occurrences of the stored items of the subset of stored items classified to the given class; and classifying an analyzing item which does not belong to the set of items by applying the defined classification scheme to attributes characterizing the analyzing item, and assigning to the analyzing item using a performance assessment value being a function of the outcome estimation value determined for the given class to which the analyzing item is classified, thereby enabling a selective application of an industrial process, wherein the selective application is responsive to the performance assessment.

21. The program storage device according to claim 20, wherein the defining of the classification scheme includes assigning a score to each attribute out of a plurality of attributes of the at least one variable, based on a number of occurrences of stored items characterized by the attribute.

22. The method according to claim 21, wherein the assigning the score comprises assigning the score to each given attribute out of the plurality of attributes based on a number of successful occurrences of the stored items characterized by the given attribute.

23. The program storage device according to claim 21, wherein the assigning the score comprises assigning the score to each given attribute out of the plurality of attributes based on a number of unsuccessful occurrences of the stored items characterized by the given attribute.

24. The program storage device according to claim 21, wherein the assigning of the score to each given attribute out of the plurality of attributes comprises computing the score to the given attribute based on: (a) a number of successful occurrences which are associated with the given attribute in a subset of the sample; (b) a number of unsuccessful occurrences which are associated with the given in the subset of the sample; and (c) a total number of occurrences which are associated with the given attribute in the subset of the sample.

25. The program storage device according to claim 20, wherein the items are keywords.

26. The program storage device according to claim 20, wherein each of the items corresponds to a targeted group of people.

27. The program storage device according to claim 20, wherein each occurrence is an impression and each successful occurrence is a click.

28. The program storage device according to claim 20, wherein each occurrence is a click and each successful occurrence is a conversion.

* * * * *